United States Patent
Wong et al.

(10) Patent No.: US 11,329,351 B2
(45) Date of Patent: May 10, 2022

(54) BATTERY CELL FOR AN ELECTRIC VEHICLE BATTERY PACK

(71) Applicant: CHONGQING JINKANG POWERTRAIN NEW ENERGY CO., LTD., Chongqing (CN)

(72) Inventors: Derek Nathan Wong, Santa Clara, CA (US); Ying Liu, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 296 days.

(21) Appl. No.: 16/234,309

(22) Filed: Dec. 27, 2018

(65) Prior Publication Data

US 2020/0212405 A1 Jul. 2, 2020

(51) Int. Cl.

| | |
|---|---|
| *H01M 50/531* | (2021.01) |
| *H01M 50/342* | (2021.01) |
| *H01M 50/548* | (2021.01) |
| *H01M 50/564* | (2021.01) |
| *B60L 50/64* | (2019.01) |
| *H01M 50/10* | (2021.01) |
| *H01M 50/543* | (2021.01) |

(52) U.S. Cl.
CPC .......... *H01M 50/531* (2021.01); *B60L 50/64* (2019.02); *H01M 50/10* (2021.01); *H01M 50/3425* (2021.01); *H01M 50/543* (2021.01); *H01M 2220/20* (2013.01)

(58) Field of Classification Search
None
See application file for complete search history.

(56) References Cited

U.S. PATENT DOCUMENTS

| 6,045,944 A * | 4/2000 | Okada ................. H01M 50/169 429/163 |
| 6,443,999 B1 * | 9/2002 | Cantave ................. H01M 6/10 29/623.1 |
| 2003/0087146 A1 * | 5/2003 | Chi .................... H01M 50/3425 429/56 |

(Continued)

OTHER PUBLICATIONS

Moore, Justin Shorb, Xavier Prat-Resina, Tim Wendorff, & Adam Hahn, E. V., John W. (Nov. 5, 2020). Ions in Solution (Electrolytes), from https://chem.libretexts.org/@go/page/49484, pp. 1-5.*

*Primary Examiner* — Cynthia H Kelly
*Assistant Examiner* — Julian Anthony
(74) *Attorney, Agent, or Firm* — Cooper Legal Group, LLC

(57) ABSTRACT

A battery cell for an electric vehicle battery pack is provided. A housing of the battery cell can define a cavity. An electrolyte material can be housed within the cavity. A first polarity terminal of the battery cell can be disposed at an open end of the housing. A first conductive tab can be disposed at a closed end of the housing and electrically coupled with a first polarity portion of the electrolyte material. A conductive rod can extend through a core of the electrolyte material and can include a first end disposed at the closed end of the housing and electrically coupled with the first conductive tab. A receptacle can be electrically coupled with the first polarity terminal and can extend towards the electrolyte material to engage with a second end of the conductive rod at the open end of the housing.

19 Claims, 11 Drawing Sheets

(56) References Cited

U.S. PATENT DOCUMENTS

| | | | |
|---|---|---|---|
| 2005/0074667 A1* | 4/2005 | Yang | H01M 6/10 |
| | | | 429/181 |
| 2006/0035140 A1* | 2/2006 | Matsumoto | H01M 50/54 |
| | | | 429/160 |
| 2008/0026286 A1* | 1/2008 | Cui | H01M 6/085 |
| | | | 429/161 |
| 2008/0070098 A1* | 3/2008 | Ray, | H01M 50/531 |
| | | | 429/53 |
| 2010/0316894 A1* | 12/2010 | Hermann | H01M 50/3425 |
| | | | 429/56 |
| 2015/0349314 A1* | 12/2015 | Yasui | H01M 10/48 |
| | | | 429/61 |

* cited by examiner

1100

PROVIDE BATTERY CELL
1105

FIG. 11

BATTERY CELL FOR AN ELECTRIC VEHICLE BATTERY PACK

BACKGROUND

Batteries can include electrochemical materials to supply electrical power to electrical components connected thereto. Such batteries can provide electrical energy to electrical systems.

SUMMARY

At least one aspect of this disclosure is directed to a battery cell of a battery pack for an electric vehicle. The battery cell can include a housing that defines a cavity that extends between an open end of the housing and a closed end of the housing. The battery cell can include an electrolyte material housed within the cavity. The electrolyte material can have a first polarity portion and a second polarity portion. The electrolyte material can define a hollow core along a central axis of the electrolyte material. The battery cell can include a first polarity terminal disposed at the open end of the housing. The battery cell can include a first conductive tab disposed at the open end of the housing. The first conductive tab can be electrically coupled with the first polarity portion of the electrolyte material. The battery cell can include a second polarity terminal disposed at the open end of the housing. The battery cell can include a gasket disposed between the first polarity terminal and the second polarity terminal. The gasket can electrically insulate the first polarity terminal from the second polarity terminal. The battery cell can include a second conductive tab disposed at the closed end of the housing. The second conductive tab can be electrically coupled with the second polarity portion of the electrolyte material. The battery cell can include a conductive rod having a body portion disposed inside the hollow core of the electrolyte material. The conductive rod can have a protruding portion coupled with the body portion. The protruding portion of the conductive rod can extend away from the electrolyte material toward the open end of the housing. The body portion of the conductive rod can be electrically coupled with the second conductive tab at the closed end of the housing. The battery cell can include an insulating layer to electrically insulate the conductive rod from the electrolyte material within the hollow core of the electrolyte material. The battery cell can include a receptacle having a support portion electrically coupled with the second polarity terminal. The receptacle can have an interface portion coupled with the support portion. The interface portion of the receptacle can extend toward the electrolyte material. The interface portion of the receptacle can engage with the protruding portion of the conductive rod at the open end of the housing to form an electrical connection that electrically couples the second polarity portion of the electrolyte material, the second conductive tab, the conductive rod, the receptacle, and the second polarity terminal.

At least one aspect of this disclosure is directed to a method of providing battery packs. The method can include forming a housing for a battery cell of a battery pack to power an electric vehicle. The housing can define a cavity between an open end of the housing and a closed end of the housing. The method can include housing, within the cavity, an electrolyte material having a first polarity portion and a second polarity portion. The electrolyte material can define a hollow core along a central axis of the electrolyte material. The method can include electrically coupling a first polarity terminal of the battery cell disposed at an open end of the housing with the first polarity portion of the electrolyte material via a first conductive tab. The method can include disposing a body portion of a conductive rod inside the hollow core of the electrolyte material. The conductive rod can have a protruding portion coupled with the body portion. The protruding portion of the conductive rod can extend away from the electrolyte material toward the open end of the housing. The method can include electrically coupling the body portion of the conductive rod with the second polarity portion of the electrolyte material via a second conductive tab at the closed end of the housing. The method can include coupling a support portion of a receptacle with a second polarity terminal of the battery cell disposed at the open end of the housing. The receptacle can have an interface portion coupled with the support portion. The interface portion can extend toward the electrolyte material. The method can include electrically coupling the interface portion of the receptacle with the protruding portion of the conductive rod at the open end of the housing to form an electrical connection that electrically couples the second polarity portion of the electrolyte material, the second conductive tab, the conductive rod, the receptacle, and the second polarity terminal.

At least one aspect of this disclosure is directed to an electric vehicle. The electric vehicle can include a battery pack installed in the electric vehicle. The electric vehicle can include a battery cell in the battery pack. The battery cell can include a housing that defines a cavity that extends between an open end of the housing and a closed end of the housing. The battery cell can include an electrolyte material housed within the cavity. The electrolyte material can have a first polarity portion and a second polarity portion. The electrolyte material can define a hollow core along a central axis of the electrolyte material. The battery cell can include a first polarity terminal disposed at the open end of the housing. The battery cell can include a first conductive tab disposed at the open end of the housing. The first conductive tab can be electrically coupled with the first polarity portion of the electrolyte material. The battery cell can include a second polarity terminal disposed at the open end of the housing. The battery cell can include a gasket disposed between the first polarity terminal and the second polarity terminal. The gasket can electrically insulate the first polarity terminal from the second polarity terminal. The battery cell can include a second conductive tab disposed at the closed end of the housing. The second conductive tab can be electrically coupled with the second polarity portion of the electrolyte material. The battery cell can include a conductive rod having a body portion disposed inside the hollow core of the electrolyte material. The conductive rod can have a protruding portion coupled with the body portion. The protruding portion of the conductive rod can extend away from the electrolyte material toward the open end of the housing. The body portion of the conductive rod can be electrically coupled with the second conductive tab at the closed end of the housing. The battery cell can include an insulating layer to electrically insulate the conductive rod from the electrolyte material within the hollow core of the electrolyte material. The battery cell can include a receptacle having a support portion electrically coupled with the second polarity terminal. The receptacle having an interface portion coupled with the support portion. The interface portion can extend toward the electrolyte material. The interface portion of the receptacle can engage with the protruding portion of the conductive rod at the open end of the housing to form an electrical connection that electrically couples the second polarity portion of the electrolyte material, the second conductive tab, the conductive rod, the receptacle, and the second polarity terminal.

At least one aspect of this disclosure is directed to a method. The method can include providing a battery cell of a battery pack to power an electric vehicle. The battery cell can include a housing that defines a cavity that extends between an open end of the housing and a closed end of the housing. The battery cell can include an electrolyte material housed within the cavity. The electrolyte material can have a first polarity portion and a second polarity portion. The electrolyte material can define a hollow core along a central axis of the electrolyte material. The battery cell can include a first polarity terminal disposed at the open end of the housing. The battery cell can include a first conductive tab disposed at the open end of the housing. The first conductive tab can be electrically coupled with the first polarity portion of the electrolyte material. The battery cell can include a second polarity terminal disposed at the open end of the housing. The battery cell can include a gasket disposed between the first polarity terminal and the second polarity terminal. The gasket can electrically insulate the first polarity terminal from the second polarity terminal. The battery cell can include a second conductive tab disposed at the closed end of the housing, the second conductive tab electrically coupled with the second polarity portion of the electrolyte material. The battery cell can include a conductive rod having a body portion disposed inside the hollow core of the electrolyte material. The conductive rod can have a protruding portion coupled with the body portion. The protruding portion of the conductive rod can extend away from the electrolyte material toward the open end of the housing. The body portion of the conductive rod can be electrically coupled with the second conductive tab at the closed end of the housing. The battery cell can include an insulating layer to electrically insulate the conductive rod from the electrolyte material within the hollow core of the electrolyte material. The battery cell can include a receptacle having a support portion electrically coupled with the second polarity terminal. The receptacle can have an interface portion coupled with the support portion. The interface portion of the receptacle can extend toward the electrolyte material. The interface portion of the receptacle can engage with the protruding portion of the conductive rod at the open end of the housing to form an electrical connection that electrically couples the second polarity portion of the electrolyte material, the second conductive tab, the conductive rod, the receptacle, and the second polarity terminal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 11 depicts a flow chart of an example process of providing a battery cell for a battery pack of an electric vehicle, according to an illustrative implementation.

Figure 1:
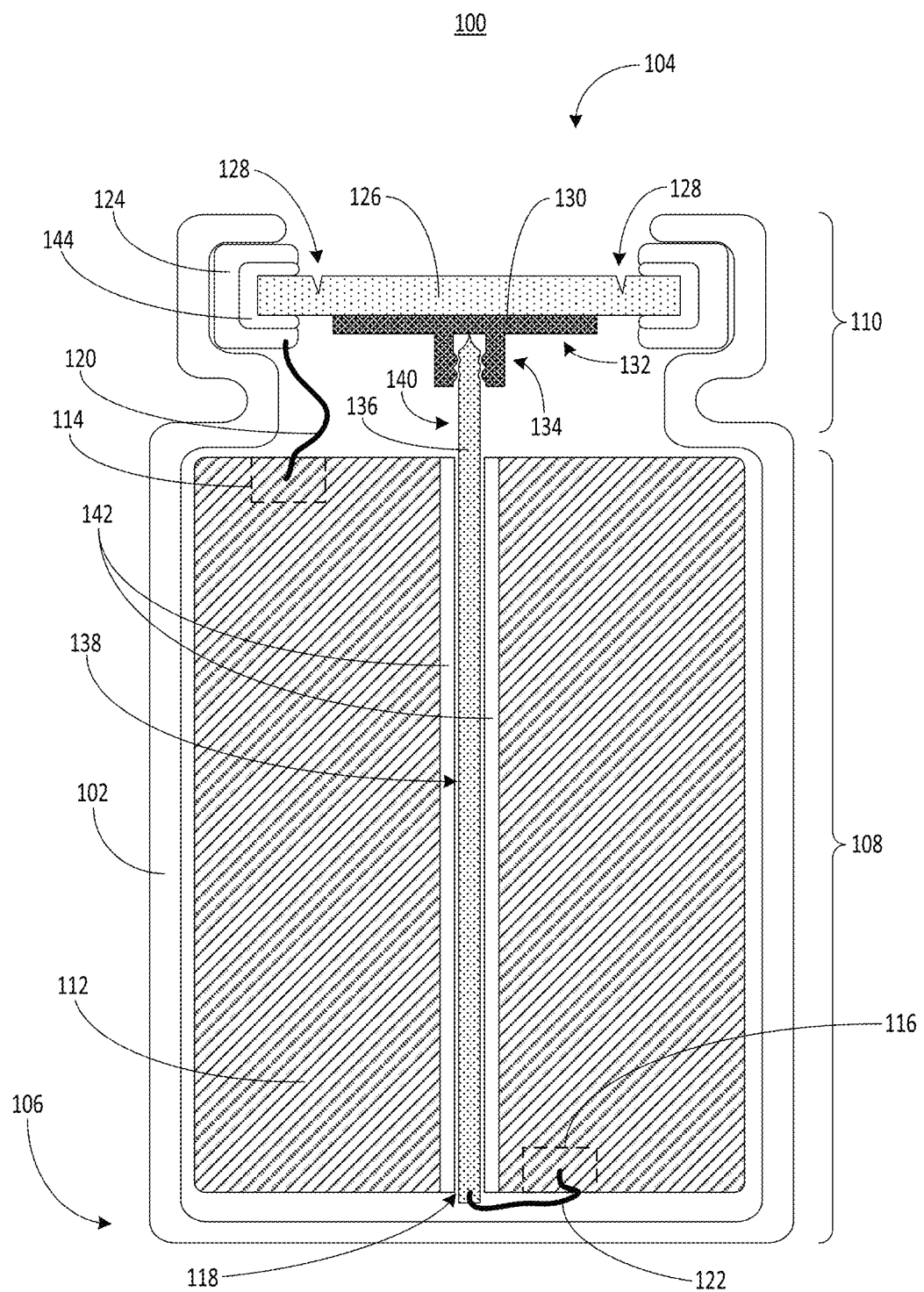
FIG. 1 depicts an example battery cell for an electric vehicle battery pack, according to an illustrative implementation.

Following below are more detailed descriptions of various concepts related to, and implementations of battery cells for battery packs of electric vehicles, and methods, apparatuses, and systems to improve the performance of the battery cells. The various concepts introduced above and discussed in greater detail below may be implemented in any of numerous ways, as the described concepts are not limited to any particular manner of implementation.

DETAILED DESCRIPTION

Systems and methods described herein relate to improving the performance of battery cells for battery packs that can provide power to electric vehicles ("EVs"). Battery packs, which can be referred to herein as battery modules, can include lithium ion battery cells. Battery packs can include any arrangement or network of electrical, electronic, mechanical or electromechanical devices to power a vehicle of any type, including an EV. EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. Electric vehicles such as automobiles can include on-board battery cells or battery packs to power the electric vehicles. It can be challenging to electrically couple a terminal of the battery cell to an electrolyte material within the battery cell.

Battery cells can be fabricated with a variety of form factors. Some battery cells can have a cylindrical form factor. Cylindrical battery cells can be assembled by inserting a winded electrode roll (e.g., a "jelly roll") including electrolyte material into a cylindrical metallic can, which can be referred to herein as a housing. Electrical connections can be spot welded to portions of the winded electrode roll. A lid can be crimped over an open end of the housing to seal it.

Electrical connections can be made between the winded electrode roll and components of the enclosure, such as the housing and the lid. For example, such electrical connections can be formed at two points, including a first polarity terminal (e.g., a positive terminal) at the lid and a second polarity terminal (e.g., a negative terminal) at the base of the housing. In some other examples of battery cells, both electrical connections can be formed at or near the open end of the housing, as there may be advantages in pack assembly efficiency when the electrical connections for both terminal of a battery cell are positioned at the same end of the battery.

Battery cells with a two-terminal configuration near the lid can be made by spot welding both the positive and negative electrode tabs from the winded electrode to the separate terminals. However, this method can present several technical challenges. For example, standard processes for winding the winded electrode can result in tab connections at opposite ends of the winded electrode. Thus, the processes may have to be changed to make both tab connections exit on the same end of the winded electrode. After one tab is welded to another component at the open end of the housing (e.g., a portion of the lid that is to be secured at the open end of the housing), the lid may have limited mobility as the first tab acts as an anchor. In addition, one tab may have to be longer than the other in order for the lid to be angled for spot welding. This can increase the likelihood of an electrical short forming after crimping. While laser welding can be implemented to bond at an angle, it can also be expensive and may require designing one or more custom fixtures to hold the tab near the weld surface.

This disclosure provides techniques for improving processes to assemble a battery cell with two terminals positioned near the lid. Generally, the techniques described in this disclosure can involve spot welding of tabs near in various locations (e.g., opposite sides of the winded electrode) while maintaining the ability to transfer the connection of at least one of the tabs (e.g., the tab positioned on the side of the winded electrode opposite the lid of the battery cell) to the desired location near the lid. The techniques described in this disclosure can therefore be accomplished by maintaining the traditional tab configuration (e.g., one on the side of the winded electrode near the lid, and the other on the opposite side away from the lid).

A battery cell can be assembled in a manner that reduces the number of spot welds at the lid of the battery cell by inserting a conductive rod or pin down a hollow core of the winded electrode and welding it to the tab connection on the side of the winded electrode opposite the lid of the battery cell. The conductive rod can extend along the full length of the winded electrode, thereby effectively extending the electrical connection of the tab from one side of the winded electrode to the other. A protruding end of the conductive rod can be pressed into a receptacle component at or near the lid of the battery cell. The receptacle component can be secured to, and electrically coupled with, a vent plate that serves as the lid of the battery cell. In some examples, the vent plate can include a scoring pattern that is designed to break in the case of a threshold gas pressurization event occurring within the battery cell. When the receptacle is attached to the conductive rod it can serve as a terminal connection for the battery cell. The other tab can be secured (e.g., by resistance welding, ultrasonic welding, or laser welding) to another surface at the open end of the battery cell that serves as the other terminal of the battery cell. Thus, the techniques described in this disclosure can establish both positive and negative connections at or near the lid of the battery cell in a manner that does not require any change to the design of the winded electrode or the process for manufacturing the winded electrode. As a result, these techniques can be applied to many types of battery cell designs, including battery cell designs that incorporate a cylindrical housing, and are not restricted to any specific lid, housing, or winded electrode configuration.

FIG. 1 depicts an example battery cell 100 for an electric vehicle battery pack, according to an illustrative implementation. The battery cell 100 can include a housing 102. The housing 102 can have an open end 104 and a closed end 106. The open end 104 can be positioned at a lateral end of the battery cell 100 that is opposite the closed end 106. The housing 102 can define a body region 108 and a crimped region 110. The crimped region 110 can be positioned at the open end 104 of the housing 102, opposite the closed end 106.

The body portion 120 of the housing 102 can define a cavity that contains an electrolyte material 112 (e.g., a jelly roll 112). The electrolyte material 112 can provide electric power for the battery cell 100. The electrolyte material 112 can be or can include a winded electrode. For example, a winded electrode can include two or more conductive layers separated from one another by an insulating layer and wound around an axis of the winded electrode. Thus, a first portion of the electrolyte material 112 can have a first polarity, and a second portion of the electrolyte material 112 can have a second polarity. For illustrative purposes, the first portion of the electrolyte material 112 is represented by the first polarity portion 114 and the second portion of the electrolyte material 112 is represented by the second polarity portion 116. However, the particular locations of these portions as depicted in FIG. 1 are illustrative only, and each of these respective portions may not be confined within the regions marked by the broken lines that correspond to the first polarity portion 114 and the second polarity portion 116 in FIG. 1. The first polarity portion 114 may be a positively charged portion of the electrolyte material 112 and the second polarity portion 116 may be a negatively charged portion of the electrolyte material 112. The first polarity portion 114 may also be a negatively charged portion of the electrolyte material 112 while the second polarity portion 116 may be a positively charged portion of the electrolyte material 112. A hollow core 118 extends along the length of the electrolyte material 112. The hollow core 118 can be aligned with the axis around which components (e.g., electrode layers) of the electrolyte material 112 are wound. The hollow core 118 can be a volume of empty space and can extend along a central axis of the electrolyte material 112.

The battery cell 100 can include a first polarity terminal 124. The first polarity terminal 124 can be positioned at the open end 104 of the battery cell 100. The first polarity terminal 124 can be positioned within the crimped region 110. The first polarity terminal 124 can serve as an electrical contact for connecting to a first polarity portion of an electrical load powered by the battery cell 100, such as one or more electrical systems of an electric vehicle. The first polarity terminal 124 can be formed from an electrically conductive material to allow the first polarity terminal 124 to carry electrical current to the electrical load. The first polarity terminal 124 can be made from a conductive metal, a conductive alloy, or a conductive polymer. For example, the first polarity terminal 124 can be made from copper, aluminum, or steel.

The first polarity terminal 124 can be electrically coupled with the first polarity portion 114 of the electrolyte material 112 via a first tab 120. The first tab 120 can carry electrical current from the first polarity portion 114 of the electrolyte material 112 to the first polarity terminal 124. The first tab 120 can be formed from a flexible conductive material, such as a conductive metal, a conductive alloy, or a conductive polymer. For example, the first tab 120 can be a flexible conductive wire or conductive ribbon. The first tab 120 can be secured to the first polarity portion 114 of the electrolyte material 112 by any suitable means that facilitates formation of an electrical connection between the first tab 120 and the first polarity portion 114 of the electrolyte material 112. For example, the first tab 120 can be secured to the first polarity portion 114 of the electrolyte material 112 as part of the process of forming the electrolyte material 112. Such a process can include winding one or more electrode components about an axis. The winding process can ensure that the first tab 120 remains secured to the first polarity portion 114 of the electrolyte material 112. For example, the first tab 120 can be coupled with the first polarity portion 114 of the electrolyte material 112 before the winding process, so that it is wound along with the electrolyte material 112. The first tab 120 can be secured to the first polarity portion 114 of the electrolyte material 112 via a weld.

The battery cell 100 can include a second tab 122. The second tab 122 can be electrically coupled with the second polarity portion 116 of the electrolyte material 112. The connection point between the second tab 122 and the second polarity portion 116 of the electrolyte material 112 can be positioned at on a side of the electrolyte material 112 opposite that the connection point between the first tab 120 and the first polarity portion 114 of the electrolyte material 112. For example, the first tab 120 can be connected with the first polarity portion 114 of the electrolyte material 112 on a side of the electrolyte material 112 that is positioned near the open end 104 of the housing 102, while the second tab 122 can be connected with the second polarity portion 116 of the electrolyte material 112 on a side of the electrolyte material 112 that is positioned nearer to the closed end 106 of the housing 102.

Like the first tab 120, the second tab 122 can be formed from a flexible conductive material, such as a conductive metal, a conductive alloy, or a conductive polymer. For example, the second tab 122 can be a flexible conductive wire or conductive ribbon. The second tab 122 can be secured to the second polarity portion 116 of the electrolyte material 112 by any suitable means that facilitates formation of an electrical connection between the second tab 122 and the second polarity portion 116 of the electrolyte material 112. For example, the second tab 122 can be secured to the second polarity portion 116 of the electrolyte material 112 as part of the process of forming the electrolyte material 112. Such a process can include winding one or more electrode components about an axis. The winding process can ensure that the second tab 122 remains secured to the second polarity portion 116 of the electrolyte material 112. For example, the second tab 122 can be coupled with the second polarity portion 116 of the electrolyte material 112 before the winding process, so that it is wound along with the electrolyte material 112. The second tab 122 can be secured to the second polarity portion 116 f the electrolyte material 112 via a weld.

The battery cell 100 can include a second polarity terminal 126. The second polarity terminal 126 can be positioned at the open end 104 of the battery cell 100. The second polarity terminal 126 can be positioned within the crimped region 110. The second polarity terminal 126 can serve as an electrical contact for connecting to a second polarity portion of the electrical load powered by the battery cell 100, such as one or more electrical systems of an electric vehicle. The second polarity terminal 126 can be formed from an electrically conductive material to allow the second polarity terminal 126 to carry electrical current to the electrical load. The second polarity terminal 126 can be made from a conductive metal, a conductive alloy, or a conductive polymer. For example, the second polarity terminal 126 can be made from copper, aluminum, or steel.

The battery cell 100 can include a gasket 144. The gasket 144 can be positioned near the open end 104 of the housing 102. The gasket 144 can be located within the crimped region 110. The gasket 144 can be positioned between the first polarity terminal 124 and the second polarity terminal 126. The gasket 144 can electrically insulate the first polarity terminal 124 from the second polarity terminal 126. The gasket 144 can be formed from an electrically insulating material, such as a plastic or rubber material. For example, the gasket 144 can be formed from polypropylene.

Within the crimped region 110 of the battery cell 100, the gasket 144 can surround an outer edge of the second polarity terminal 126. The first polarity terminal 124 can surround an outer edge of the gasket 144 (e.g., an opposite side of the gasket 144 from the second polarity terminal 126). A crimped edge of the open end 104 of the housing 102 can surround an outer edge of the first polarity terminal 124. The first polarity terminal 124, the gasket 144, and the housing 102 can each be formed from a malleable or conformable material such that, upon performance of a crimping operation that forms the crimped region 110 of the housing 102, the gasket 144 is deformed to surround the outer edge of the second polarity terminal 126 and the first polarity terminal 124 is deformed to surround the gasket 144. In some examples, the first polarity terminal 124 can have a cup shape either before or after the crimping operation that defines the crimped region 110, and the gasket 144 and the second polarity terminal 126 can be positioned within the cup. Each of the second polarity terminal 126, the gasket 144, and the gasket 144 can be secured within the crimped region 110 of the housing 102 after the crimping operation is performed. Thus, together, the second polarity terminal 126, the gasket 144, the first polarity terminal 124, and the housing 102 can form a seal that seals the electrolyte material 112 within the cavity defined by the body region 108 of the housing 102.

The housing 102 can be electrically insulated from a portion (e.g., the second polarity portion 116) of the electrolyte material 112 that is electrically coupled with the second polarity terminal 126. The housing 102 can also be electrically coupled to another portion (e.g., the first polarity portion 114) of the electrolyte material 112 to allow the housing 105 to serve as at least part of a terminal of the battery cell 100, such as the first polarity terminal 124. For example, the housing 102 can be formed from a conductive material, such as steel, aluminum, or copper, so that the housing can conduct electrical current. The housing 102 can be in contact with at least a portion of the first polarity terminal 124, such that the housing 102 is kept at the same electrical potential as the first polarity terminal 124. Thus, the housing 102 can also serve as a portion of the first polarity terminal of the battery cell 100.

The second polarity terminal 126 can include a scoring pattern 128. The scoring pattern 128 can include one or more marks formed on or into a surface of the second polarity terminal 126. For example, the scoring pattern 128 can include one or more troughs, divots, cutouts, holes, grooves, or other patterns that render a thickness of the second polarity terminal 126 at the scoring pattern 128 thinner than a thickness of the unscored portions of the second polarity terminal 126. The scoring pattern 128 can be formed by removing a portion of the material that makes up the second polarity terminal 126. For example, the scoring pattern 128 can be formed on or defined within the second polarity terminal 126 by etching, scraping, ablating, vaporizing, or cutting away some of the material of the second polarity terminal 126.

The scoring pattern 128 can be a continuous pattern on the surface of the second polarity terminal 126. For example, the scoring pattern 128 can be a continuous groove that is etched into a surface of the second polarity terminal 126. Such a groove can form a closed loop on the surface of the second polarity terminal 126. For example, the scoring pattern 128 can be continuous and can enclose, define, or outline a scored region on a surface of the second polarity terminal 126. The scored region can take the shape of a circle, an oval, a rectangle, or any other curved or polygonal shape. In the example cross-sectional view shown in FIG. 1, the triangular divots representing the scoring pattern 128 in the second polarity terminal 126 can each be positioned on opposite sides of a such a closed loop. The scoring pattern 128 also can be discontinuous. For example, the scoring pattern 128 can include a series of discontinuous troughs, divots, holes, grooves, or cutouts, such as a perforated line. The scored region of the surface of the second polarity terminal 126 that is defined by the scoring pattern 128 can be either a symmetrical pattern or an asymmetrical pattern.

The second polarity terminal 126 can be thinner where the scoring pattern 128 is present than across a remainder (e.g., an unscored portion) of the second polarity second polarity terminal 126. Therefore, the scoring pattern 128 can cause the second polarity terminal 126 to tear or rupture along the scoring pattern 128 in response to a predetermined threshold pressure within the battery cell 100. For example, the scoring pattern 128 can be selected to intentionally weaken the second polarity terminal 126 along the scoring pattern 128 so that the second polarity terminal 126 tears or ruptures when the threshold pressure is reached inside the housing 102. Thus, when the threshold pressure is reached, the second polarity terminal 126 can tear or rupture in a manner that separates the scored region of the second polarity terminal 126 within the scoring pattern 128 from a remainder of the second polarity terminal 126. The scored region of the second polarity terminal 126 therefore can become at least partially separated from a remainder of the second polarity terminal 126 (e.g., a portion of the second polarity terminal 126 outside of the scored region). As a result, gas that has built up to cause the threshold pressure within the housing 102 can escape from the housing 102, thereby relieving the pressure.

The battery cell 100 can also include a receptacle 130 and a conductive rod 136. Together, the receptacle 130 and the conductive rod 136 can carry electrical current from the second tab 122 near the closed end 106 of the housing 102 up to the second polarity terminal 126 at the open end 104 of the housing 102. The receptacle 130 can include a support portion 132 and an interface portion 134. The support portion 132 of the receptacle 130 can be coupled with the second polarity terminal 126. The interface portion 134 can extend away from the second polarity terminal 126 and toward the electrolyte material 112.

The technique used to couple the receptacle 130 with the second polarity terminal 126 can be selected to facilitate the formation of an electrical connection between the receptacle 130 and the second polarity terminal 126. For example, the support portion 132 of the receptacle 130 can be welded (e.g., via spot welding, laser welding, or ultrasonic welding) to the underside of the second polarity terminal 126. To further facilitate an electrical connection between the receptacle 130 and the second polarity terminal 126, a shape of the support portion 132 of the receptacle 130 can be selected to match a shape of the underside of the second polarity terminal 126. For example, as shown in the cross-sectional view of FIG. 1, both the support portion 132 of the receptacle 130 and the underside of the second polarity terminal 126 can be flat such that the entire surface area of the support portion 132 of the receptacle 130 is in contact with the underside of the second polarity terminal 126. The second polarity terminal 126 may also be shaped such that its lower surface is curved instead of flat. In such instances, the support portion 132 of the receptacle 130 also can be curved. For example, the support portion 132 of the receptacle 130 can have a curved shape selected to match or conform to that of the second polarity terminal 126, such that a majority or an entirety of the surface of the support portion 132 can be positioned in contact with the underside of the second polarity terminal 126 to facilitate an electrical connection between them.

The receptacle 130 can be formed from a conductive material so that it can carry electrical current to the second polarity terminal 126. For example, the receptacle 130 can be formed from a conductive metal, a conductive alloy, or a conductive polymer. The receptacle 130 can be formed from steel, aluminum, or copper. The support portion 132 and the interface portion 134 of the receptacle 130 can be formed together as an integral part. The support portion 132 and the interface portion 134 of the receptacle 130 also can be formed as separate parts that are fused or joined together after fabrication. For example, the support portion 132 can be formed separately from the interface portion 134 and then the support portion 132 can be joined with the interface portion 134, such as by welding or via one or more mechanical fasteners. The material selected for the support portion 132 may be the same as the material selected for the interface portion 134. The material selected for the support portion 132 also may be different from the material selected for the interface portion 134.

The conductive rod 136 can include a body portion 138 and a protruding portion 140. The body portion 138 of the conductive rod 136 can be positioned within the hollow core 118 of the electrolyte material 112. For example, during assembly of the battery cell 100, the conductive rod 136 can be inserted into the hollow core 118 of the electrolyte material 112 such that the body portion 138 of the conductive rod 136 remains positioned within the hollow core 118 of the electrolyte material 112, while the protruding portion 140 of the conductive rod 136 extends toward the receptacle 130. The body portion 138 and the protruding portion 140 of the conductive rod 136 can be coupled with one another.

The body portion 138 of the conductive rod 136 can be continuous with the protruding portion 140 of the protruding portion 140. For example, the body portion 138 and the conductive rod 136 may be formed together as an integral part. Thus, the conductive rod 136 can be defined as the portion of the conductive rod 136 that is positioned within the hollow core 118 of the electrolyte material 112, and the protruding portion 140 can be defined as the portion of the conductive rod 136 that protrudes from the hollow core 118 of the electrolyte material 112 and extends toward the receptacle 130 when the battery cell 100 is assembled, as depicted in FIG. 1. The body portion 138 and the protruding portion 140 of the conductive rod 136 also can be formed separately from one another. For example, the body portion 138 and the protruding portion 140 can be made as separate components and can be fused or joined together (e.g., by welding) to form the conductive rod 136.

The conductive rod 136 can form an electrical connection between the second tab 122 and the receptacle 130. Thus, the conductive rod 136 can be formed from a conductive material such as a conductive metal, a conductive alloy, or a conductive polymer. The conductive rod 136 can be formed, for example, from aluminum, steel, or copper. The protruding portion 140 of the conductive rod 136 can be electrically coupled with the second tab 122 near the closed end 106 of the housing 102. For example, the protruding portion 140 of the conductive rod 136 can be welded to the second tab 122. The protruding portion 140 of the conductive rod 136 can be spot welded, ultrasonically welded, or laser welded to the second tab 122. As a result of the electrical connection formed between the protruding portion 140 of the conductive rod 136 and the second tab 122, the conductive rod 136 can be electrically coupled with the second polarity portion 116 of the electrolyte material 112.

The protruding portion 140 of the conductive rod 136 can be electrically coupled with the interface portion 134 of the receptacle 130. The interface portion 134 of the receptacle 130 can receive at least a portion of the protruding portion 140 of the conductive rod 136. For example, the interface portion 134 of the receptacle 130 can include a hole, an opening, or a void into which a portion of the protruding portion 140 of the conductive rod 136 can be inserted as shown in FIG. 1. The hole, opening, or void in the interface portion 134 of the receptacle 130 can also engage with the protruding portion 140 of the conductive rod 136. For example, engagement between the interface portion 134 of the receptacle 130 and the protruding portion 140 of the conductive rod 136 can include any mechanical interaction that serves to facilitate and maintain contact between the protruding portion 140 of the conductive rod 136 and the interface portion 134 of the receptacle 130. Such contact can form an electrical connection between the interface portion 134 of the receptacle 130 and the protruding portion 140 of the conductive rod 136. Engagement between the protruding portion 140 of the conductive rod 136 and the interface portion 134 of the receptacle 130 can include friction or other mechanical interference between these components that tends to cause them to remain in physical and electrical contact with one another. Thus, the protruding portion 140 of the conductive rod 136 can be secured within the interface portion 134 of the receptacle 130 via an interference fit, or a friction fit or a press fit, for example.

The body portion 138 of the conductive rod 136 runs along substantially the entire length of the electrolyte material 112, and the protruding portion 140 of the conductive rod 136 protrudes beyond the electrolyte material 112 to engage with the interface portion 134 of the receptacle 130. Thus, an electrical path is formed between the second polarity portion 116 of the electrolyte material 112, the second tab 122, the conductive rod 136, the receptacle 130, and the second polarity terminal 126. As a result, the second polarity terminal 126 can be electrically coupled with the second polarity portion 116 of the electrolyte material 112, while the first polarity terminal 124 is electrically coupled with the first polarity portion 114 of the electrolyte material 112.

Both the first polarity terminal 124 and the second polarity terminal 126 can be positioned at the open end 104 of the housing 102. This arrangement can help to make the process of coupling the first polarity terminal 124 and the second polarity terminal 126 to the electrical load that is powered by the battery cell 100, as compared to an arrangement in which one of the first polarity terminal 124 and the second polarity terminal 126 may be positioned closer to the closed end 106 of the housing 102. In addition, the combination of the conductive rod 136 and the receptacle 130 allows the electrical connection from the second tab 122 near the closed end 106 of the housing 102 to be routed up to the open end 104 of the housing 102 without the need for the second tab 122 itself to be routed up toward the open end 104 of the housing 102. Furthermore, the engagement of the conductive rod 136 and the interface portion 134 of the receptacle 130 can dispense with any need for forming an additional spot weld (or other type of weld) at the open end 104 of the housing 102 to couple the second polarity terminal 126 to the second polarity portion 116 of the electrolyte material 112.

The battery cell 100 also can include an insulating layer 142. The insulating layer 142 can ensure that the body portion 138 of the conductive rod 136 does not form a short circuit with any portion of the electrolyte material 112 within the hollow core 118. The insulating layer 142 can be positioned between the body portion 138 of the conductive rod 136 and the electrolyte material 112. For example, the insulating layer 142 can coat an inner surface of the hollow core 118 of the electrolyte material 112 to prevent the body portion 138 of the conductive rod 136 from coming into contact with the electrolyte material 112. The insulating layer 142 can be formed from an electrically insulating material, such as a rubber or plastic material. The insulating layer 142 can be formed together with the electrolyte material 112. For example, the insulating layer 142 can be positioned with other components of the electrolyte material 112 and wound together with those components such that after the winding process, the insulating layer 142 remains positioned along the surface of the hollow core 118 of the electrolyte material 112. The insulating layer 142 can extend along an entire length of the hollow core 118 of the electrolyte material 112.

Figure 2:
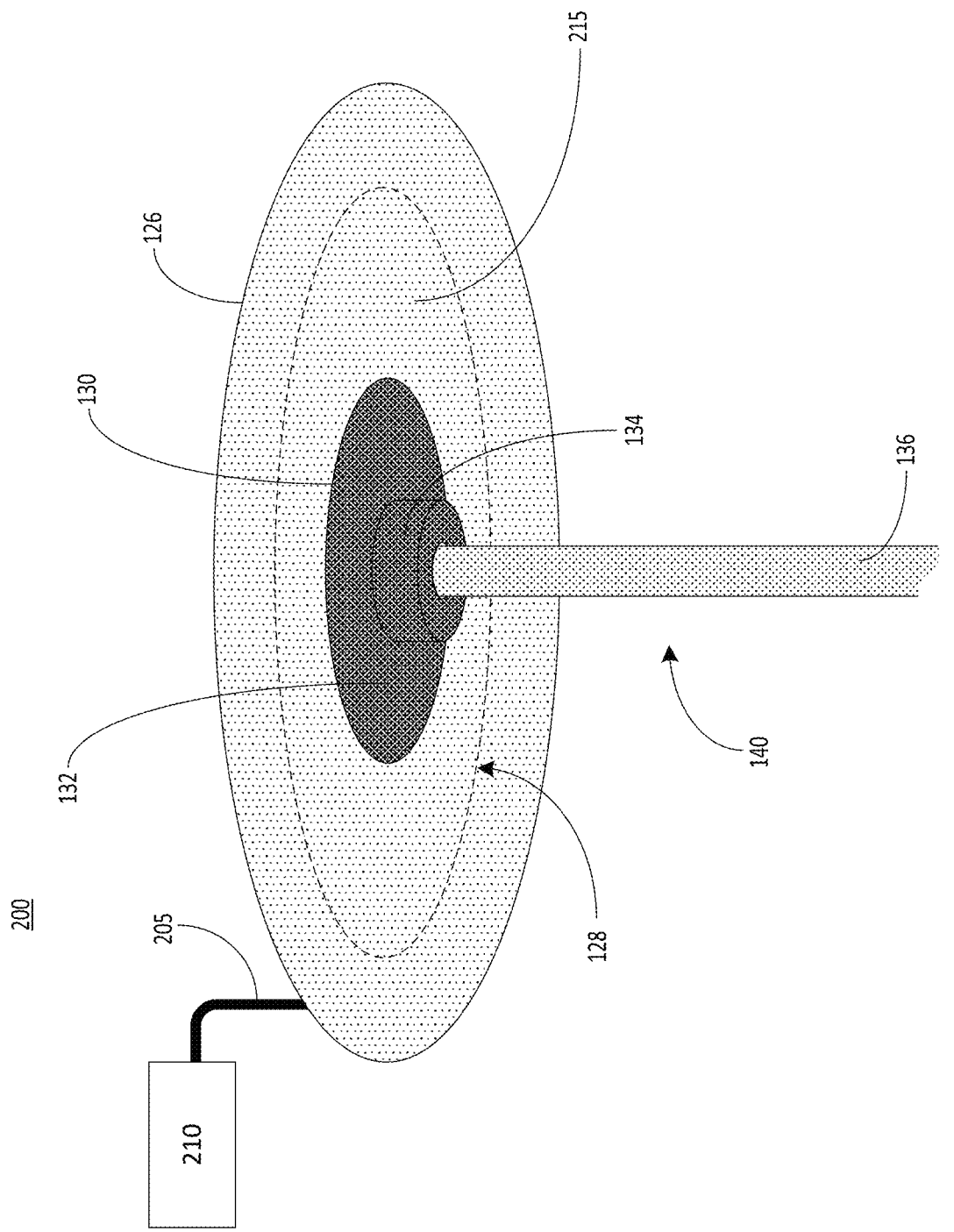
FIG. 2 depicts a perspective view of a portion of the example battery cell of FIG. 1, according to an illustrative implementation.

FIG. 2 depicts a perspective view 200 of a portion of the example battery cell of FIG. 1, according to an illustrative implementation. Illustrated are the second polarity terminal 126, the support portion 132, and the conductive rod 136. Also shown is a wire 205 and a current collector 210. For illustrative purposes, other components of the battery cell 100 are not depicted in FIG. 2. FIG. 2 shows the conductive rod 136 and the receptacle 130 in an assembled configuration, similar to that depicted in FIG. 1, in which a portion of the conductive rod 136 is inserted into the interface portion 134 of the receptacle 130 to engage with the receptacle 130. The wire 205 can electrically couple the second polarity terminal 126 to the current collector 210 (e.g., a busbar 210). The conductive rod 136 can be coupled with the second polarity terminal 126 via the receptacle 130. The conductive rod 136 also can be coupled with the second polarity portion 116 of the electrolyte material 112, as depicted in FIG. 1. Thus, electrical current can flow from the second polarity portion 116 of the electrolyte material 112, through the conductive rod 136 to the receptacle 130. From the receptacle 130 the current can flow to the second polarity terminal 126 and then through the wire 205 to the current collector 210.

The wire 205 can be coupled, joined, or otherwise fastened to the second polarity terminal 126 and the current collector 210 in any manner that allows the wire 205 to form an electrical connection with each of the second polarity terminal 126 and the current collector 210. For example, the wire 205 can be coupled to either or both of the second polarity terminal 126 or the current collector 210 via an electrically conductive adhesive or one or more electrically conductive mechanical fasteners. The wire 205 can also be coupled to the second polarity terminal 126 or the current collector 210 via a press fit or friction fit. The wire 205 can also be coupled to the second polarity terminal 126 or the current collector 210 via a weld.

The second polarity terminal 126 can have a substantially planar shape. For example, the second polarity terminal 126 can be a flat disc of material having a circular perimeter. The second polarity terminal 126 can also have other shapes. For example, the second polarity terminal 126 can be square, triangular, hexagonal, octagonal, or irregular in shape. The shape of the second polarity terminal 126 can be selected to match a shape of the housing 102. For example, if the housing 102 has a cylindrical shape with circular cross-sections, the second polarity terminal 126 can have a circular shape. The second polarity terminal 126 can also have a shape that is different from the cross-sectional shape of the housing 102.

The support portion 132 of the receptacle 130 can have a substantially planar shape. For example, the second polarity terminal 126 can be a flat disc of material that is parallel to a surface of the second polarity terminal 126. The support portion 132 of the receptacle 130 can also have other shapes. For example, the support portion 132 of the receptacle 130 can be square, triangular, hexagonal, octagonal, or irregular in shape. The shape of the support portion 132 of the receptacle 130 can be selected to match a shape of the second polarity terminal 126. For example, if the second polarity terminal 126 has a circular shape, the support portion 132 of the receptacle 130 can have a circular shape. The support portion 132 of the receptacle 130 can also have a shape that is different from the shape of the second polarity terminal 126.

The second polarity terminal 126 can include the scoring pattern 128 which defines a scored region 215 on a surface of the second polarity terminal 126. The scored region 215 can be the area of the second polarity terminal 126 that is located within or surrounded by the scoring pattern 128. The scoring pattern 128 can include one or more marks, depicted by broken lines in FIG. 2, formed on or into a surface of the second polarity terminal 126. For example, the scoring pattern 128 can include one or more troughs, divots, cutouts, holes, grooves, or other patterns that render a thickness of the second polarity terminal 126 at the scoring pattern 128 thinner than a thickness of the unscored portions of the second polarity terminal 126. The scored region 215 can take the shape of a circle, an oval, a triangle a rectangle, a hexagon, an octagon or any other curved or polygonal shape. The scored region 215 can also have an irregular shape.

Figure 3:
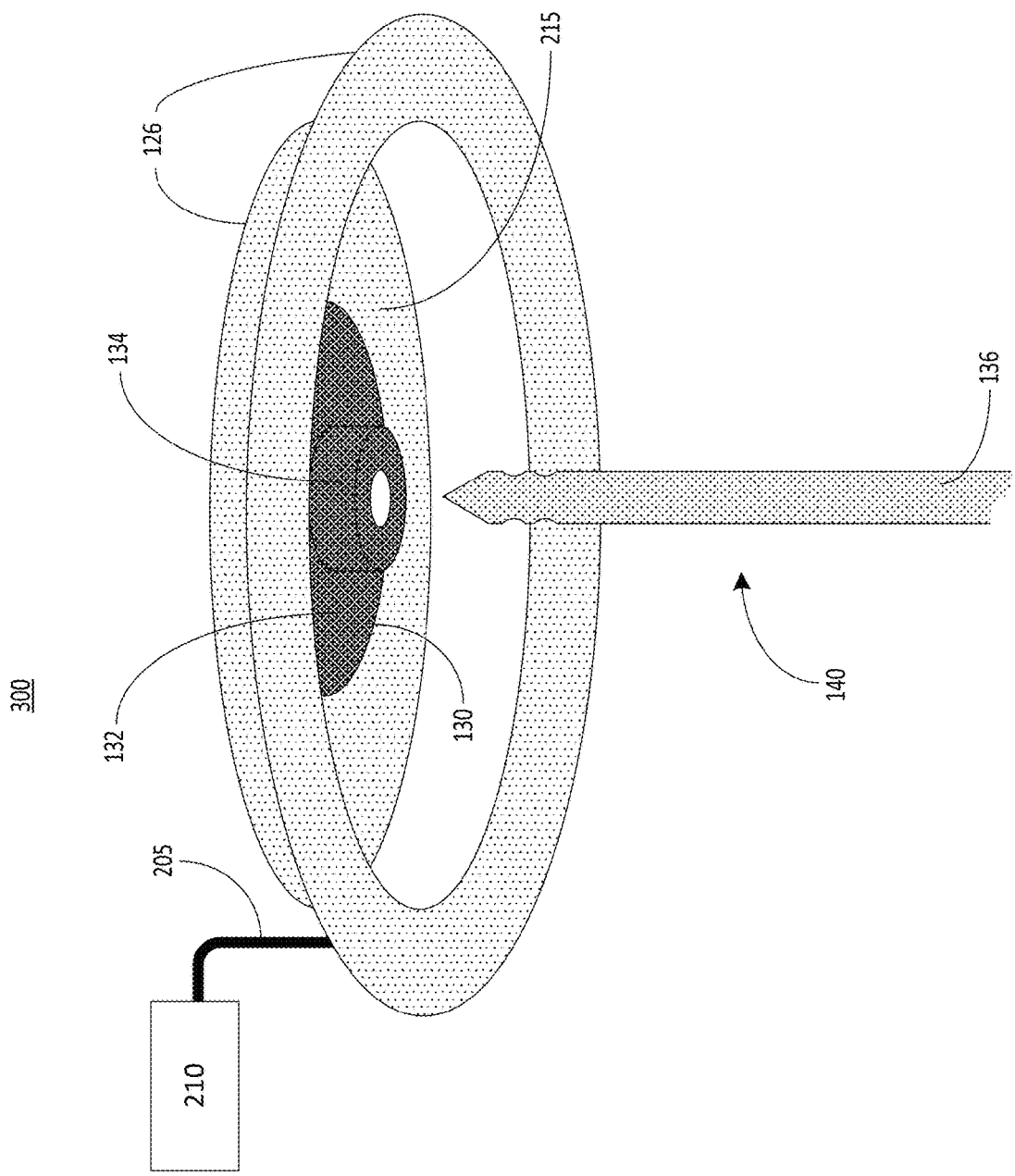
FIG. 3 depicts a perspective view of a portion of the example battery cell of FIG. 1, according to an illustrative implementation.

FIG. 3 depicts a perspective view 300 of a portion of the example battery cell of FIG. 1, according to an illustrative implementation. The second polarity terminal 126 is depicted as torn in the example view 300. The second polarity terminal 126 can be thinner where the scoring pattern 128 is present than across a remainder (e.g., an unscored portion) of the second polarity terminal second polarity terminal 126. For example, the scoring pattern 128 can be selected to remove about 40%, about 50%, or about 60% of the thickness of the material of the second polarity terminal 126 in the area where the scoring pattern 128 is present. Therefore, the scoring pattern 128 can cause the second polarity terminal 126 to tear or rupture along the scoring pattern 128 in response to a predetermined threshold pressure within the battery cell 100.

The scoring pattern 128 can weaken the second polarity terminal 126 along the scoring pattern 128 so that the second polarity terminal 126 tears or ruptures when the threshold pressure is reached inside the housing 102. Thus, when the threshold pressure is reached, the second polarity terminal 126 can tear or rupture in a manner that separates the scored region 215 of the second polarity terminal 126 within the scoring pattern 128 from a remainder of the second polarity terminal 126, as depicted in FIG. 3. As shown, the scored region 215 of the second polarity terminal 126 can become at least partially separated from a remainder of the second polarity terminal 126 (e.g., a portion of the second polarity terminal 126 outside of the scored region 215). As a result, gas that may have built up to cause the threshold pressure within the housing 102 can escape from the housing 102, thereby relieving the pressure. The second polarity terminal 126 can therefore serve as a vent plate to vent gases that may trigger a threshold pressure within the battery cell 100. Thus, the second polarity terminal 126 can also be referred to herein as a vent plate 126.

The receptacle 130 receives electrical current from the conductive rod 136 and passes the electrical current to the second polarity terminal 126. In some examples, the receptacle 130 can be coupled to the second polarity terminal 126 at any point within the scored region 215. The wire 205 can be coupled to the second polarity terminal 126 at any point outside of the scored region 215. As pressure within the battery cell 100 increases, stresses can accumulate in the second polarity terminal 126. Due to the scoring pattern 128 formed on the surface of the second polarity terminal 126, the second polarity terminal 126 can rupture or tear along the scoring pattern 128 when a threshold pressure is reached. As a result, the scored region 215 of the second polarity terminal 126 can become separated from a remainder of the second polarity terminal 126, as depicted in FIG. 3. For example, the threshold pressure can cause the scored region 215 of the second polarity terminal 126 to be forced up and away from a remainder of the second polarity terminal 126, because the remainder of the second polarity terminal 126 can be secured in place by the housing 102 in the crimped region 110, as depicted in FIG. 1.

When the scored region 215 of the second polarity terminal 126 is forced away from the remainder of the second polarity terminal 126, the connection between the conductive rod 136 and the interface portion 134 of the receptacle 130 can become broken. For example, while the interface portion 134 of the receptacle 130 and the conductive rod 136 may engage with one another in a manner that helps to facilitate an electrical connection between the interface portion 134 of the receptacle 130 and the conductive rod 136, the force on the second polarity terminal 126 and the receptacle 130 from the threshold pressure within the battery cell 100 can be sufficient to push the second polarity terminal 126 and the receptacle 130 away from the conductive rod 136 to break the electrical connection. The conductive rod 136 can remain fixed in its original location within the battery cell 100.

After the scored region 215 of the second polarity terminal 126 becomes separated from the remainder of the second polarity terminal 126, the electrical connection between the second polarity portion 116 of the electrolyte material 112 and the wire 205 can become broken so that current within the battery cell 100 is interrupted (e.g., current no longer flows to the current collector 210 via the wire 205). For example, by securing the receptacle 130 to the second polarity terminal 126 at an area within the scored region 215 of the second polarity terminal 126, and securing the wire 205 to the second polarity terminal 126 at a point outside of the scored region 215, an electrical connection between the wire 205 and the electrolyte material 112 is severed when the scored region 215 of the second polarity terminal 126 tears, ruptures, or otherwise becomes separated from the remainder of the second polarity terminal 126. Thus, current from the battery cell 100 no longer flows to the current collector 210.

FIGS. 2 and 3 depict the second polarity terminal 126, the scoring pattern 128, and the receptacle 130 as each being circular and concentric with one another. However, this need not be the case. Any of these components may have a different shape or alignment with respect to the others. For example, the scoring pattern 128 may not be concentric with the second polarity terminal 126, and the receptacle 130 may not be concentric with the scoring pattern 128. Generally, the support portion 132 of the receptacle 130 can be secured to the second polarity terminal 126 at any area within the scored region 215 defined by the scoring pattern 128, and the wire 205 can be secured to the second polarity terminal 126 at any point outside of the scored region 215, without departing from the scope of this disclosure. In addition, in some implementations the receptacle 130 may at least partially overlap with the scoring pattern 128. Thus, a portion of the receptacle 130 may be positioned within the scored region 215, while another portion may be positioned outside of the scored region 215.

Figure 4:
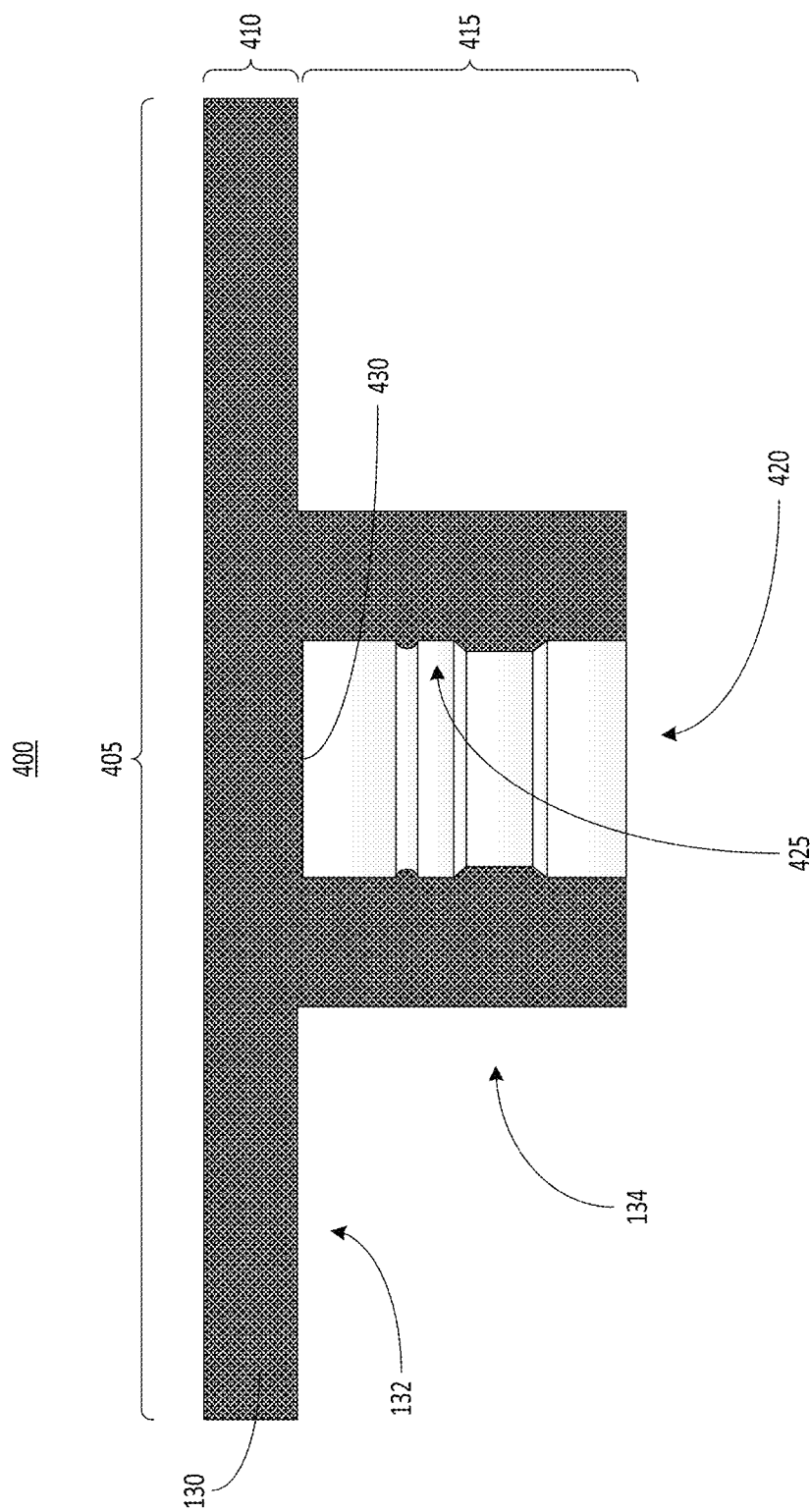
FIG. 4 depicts a cross-sectional view of a receptacle that can be used with the example battery cell of FIG. 1, according to an illustrative implementation.

FIG. 4 depicts a cross-sectional view 400 of a receptacle 130 that can be used with the example battery cell 100 of FIG. 1, according to an illustrative implementation. The receptacle 130 includes the support portion 132 and the interface portion 134. The support portion 132 can couple the receptacle 130 to the second polarity terminal 126. Thus, the support portion 132 can serve as a mounting surface that can be attached to the second polarity terminal 126. The support portion 132 can have a planar shape to provide a substantially flat mounting surface. The support portion 132 can also have a curved or angled shape in some implementations. For example, the support portion 132 can have a shape with curves or angles selected to fit alongside any curves or angles that may exist on the surface of the second polarity terminal 126 to which the support portion 132 is attached.

The support portion 132 of the receptacle 130 can have a diameter 405 between 2 mm and 20 mm, between 4 mm and 18 mm, between 6 mm and 16 mm, between 8 mm and 14 mm, or between 10 mm and 12 mm. Other ranges are also possible. In instances in which the support portion 132 of the receptacle 130 does not have a circular shape, the dimensions above may be selected for a width of the support portion 132, rather than a diameter. Thus, the diameter 405 can also be referred to in this disclosure as a width 405. The support portion 132 of the receptacle 130 can have a thickness 410 between 1 mm and 10 mm. For example, the support portion 132 of the receptacle 130 can have a thickness 410 of 2 mm, 4 mm, 6 mm, or 8 mm. The support portion 132 of the receptacle 130 can have a thickness 410 can have a thickness between 2 mm and 6 mm. In some implementations, the support portion 132 of the receptacle 130 can have a thickness substantially equal to a thickness of the second polarity terminal 126 to which it is coupled.

The interface portion 134 of the receptacle 130 can be coupled with the support portion 132 and can extend away from the support portion 132. The interface portion 134 can have a length 415 between 0.5 mm and 1.5 mm. For example, the interface portion 134 can have a length 415 of 0.5 mm, 0.8 mm, 1.0 mm, 1.2 mm, or 1.5 mm. The interface portion 134 can define an opening 420. The opening 420 can receive the protruding portion 140 of the conductive rod 136. The opening 420 can facilitate engagement of the receptacle 130 and the conductive rod 136. For example, an inner side surface of the opening 420 can include an engagement pattern 425. The engagement pattern 425 can be any topological feature that exerts a force on or otherwise mechanically engage with the protruding portion 140 of the conductive rod 136. For example, the engagement pattern 425 can include variations in the diameter of the opening 420. Such variations can be formed by features such as grooves, projections, cutouts, or other textured features along an inner surface of the opening 420. These features can be formed, for example, using additive manufacturing techniques that add additional material to selected portions of the inner side surfaces of the opening 420 to cause variations in the diameter. These features can also be formed by etching or removing a portion of the material from the inner side surfaces of the opening 420. These features can also be formed using a casting processes. For example, a mold of the receptacle 130 can be made based on a desired shape of the receptacle 130, including any features of the engagement pattern 425. Material such as molten metal can then be poured into the mold and allowed to set in the shape of the mold to form the receptacle 130.

A rear surface 430 can define an end of the opening 420. The rear surface 430 can be formed by the support portion 132 of the receptacle 130. In some implementations, the rear surface 430 can exert a compressive force on the conductive rod 136 when the conductive rod 136 is inserted into the opening 420. Thus, an end of the conductive rod 136 may be positioned in contact with the rear surface 430 when the battery cell 100 is in an assembled configuration, such that the rear surface 430 can press on the conductive rod 136 to ensure a good electrical connection between the conductive rod 136 and the receptacle 130 during normal operating conditions.

Figure 5:
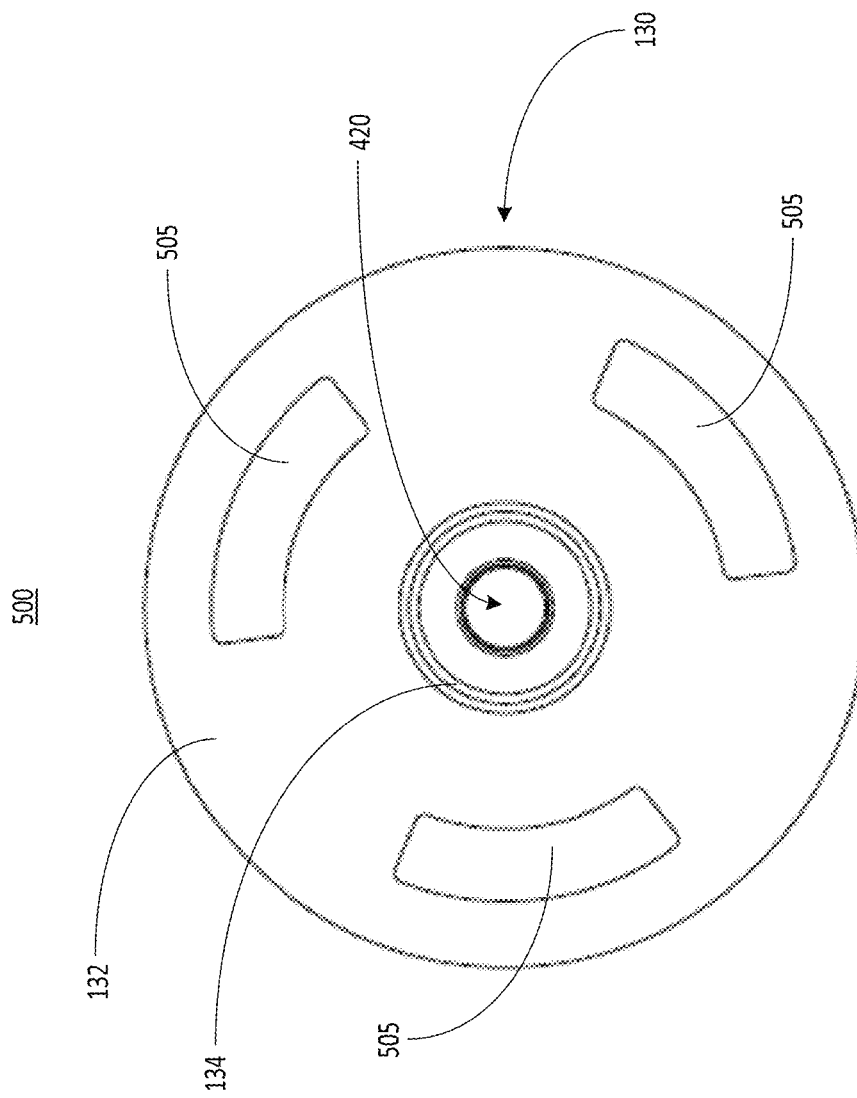
FIG. 5 depicts a top-down view of a receptacle that can be used with the example battery cell of FIG. 1, according to an illustrative implementation.

FIG. 5 depicts a top-down view 500 of an example receptacle 130 that can be used with the example battery cell 100 of FIG. 1. The view 500 depicts the support portion 132 of the receptacle 130 as a circular surface, with the interface portion 134 of the receptacle 130 extending toward the viewer. The support portion 132 can include cutouts 505. The cutouts 505 can serve to allow gas to pass through the support portion 132 of the receptacle 130. For example, during certain operating conditions referred to herein as thermal runaway, gas pressure may build up inside the battery cell 100. If the pressure reaches a threshold level, it may be desirable to interrupt current in the battery cell 100. To achieve this, a portion of a lid of the battery cell 100 (e.g., the second polarity terminal 126) can break or tear away in response to the threshold pressure being reached within the battery cell 100. After the second polarity terminal 126 has broken or torn away, gases that contributed to the pressure threshold being reached within the battery cell 100 can escape through the cutouts 505 in the support portion 132 of the receptacle 130.

The support portion 132 can include any number of cutouts 505. For example, the support portion 132 can include one, two, three, four, five, or more cutouts 505. In some examples, the cutouts 505 may be optional features of the support portion 132 of the receptacle 130. For example, the support portion 132 may not include any cutouts 505. The cutouts 505 can be arranged in a radially symmetric fashion about a center of the receptacle 130. Such an arrangement can help to more evenly distribute gases that escape through the support portion 132 in the event of a threshold pressure condition within the battery cell 100. The cutouts 505 can have a variety of shapes. For example, as depicted in FIG. 5, the cutouts 505 can have curved edges that follow a curvature of a perimeter of the support portion 132 of the receptacle 130. The cutouts 505 may also have other shapes. For example, the cutouts 505 can be circular, elliptical, triangular, rectangular, hexagonal, octagonal, or irregular in shape.

A size and shape of the support portion 132, as well as sizes, shapes, quantities, and arrangements of the cutouts 505, can be selected to facilitate coupling of the support portion 132 with the second polarity terminal 126. For example, the support portion 132 can be selected to have a size and shape that provide sufficient surface area for the formation of one or more spot welds to couple the support portion 132 to the second polarity terminal 126. In addition, a total surface area of the support portion 132 can be selected to evenly distribute pressure forces onto the second polarity terminal 126 in the event of a threshold pressure condition within the battery cell 100.

Figure 6:
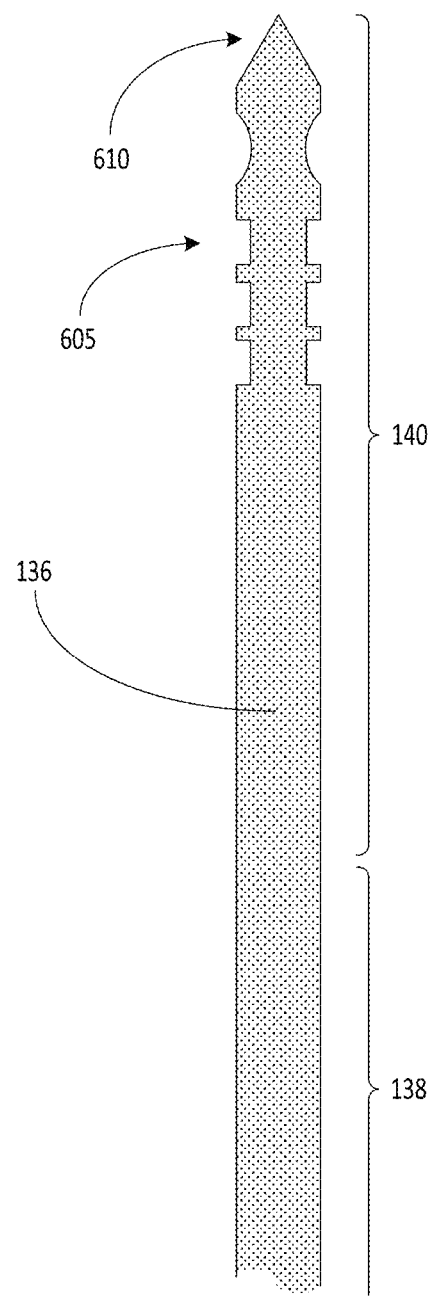
FIG. 6 depicts a view of a conductive rod that can be used with the example battery cell of FIG. 1, according to an illustrative implementation.

FIG. 6 depicts a view 600 of an example conductive rod 136 that can be used with the example battery cell 100 of FIG. 1. The conductive rod 136 can route an electrical connection from the closed end 106 of the battery cell 100 to the open end 104. The conductive rod 136 can include a body portion 138 and a protruding portion 140 that may be coupled with one another. The body portion 138 can be inserted into the hollow core 118 of the electrolyte material 112. An end of the body portion 138 of the conductive rod 136 can be positioned near the closed end 106 of the housing 102 and can be coupled with the second tab 122, in turn is coupled with the second polarity portion 116 of the electrolyte material 112. The protruding portion 140 of the conductive rod 136 can be at least partially inserted into the receptacle 130, which in turn is coupled with the second polarity terminal 126. Thus, the conductive rod 136 can allow current to flow from the second tab 122 at the closed end 106 of the housing 102 to the second polarity terminal 126 at the open end 104 of the housing 102.

The conductive rod 136 can be formed from a conductive metal or alloy, such as copper, aluminum, or steel. The body portion 138 of the conductive rod 136 can fit within the hollow core 118 of the electrolyte material 112. In some implementations, the conductive rod 136 can be substantially cylindrical and can have a diameter between 1 mm and 4 mm. For example, the conductive rod 136 can have a diameter of 1 mm, 2 mm, 3 mm, or 4 mm. In instances in which the conductive rod 136 may have not a cylindrical shape, these dimensions may be selected for a width of the conductive rod 136, rather than a diameter. For example, the conductive rod 136 can have a triangular cross-sectional shape, a rectangular cross-sectional shape, a hexagonal cross-sectional shape, or an octagonal cross-sectional shape. Other shapes and dimensions are also possible.

The total length of the conductive rod 136 (e.g., a length of the body portion 138 and the protruding portion 140 together) can be between 65 mm and 75 mm. For example, the total length of the conductive rod 136 can be 65 mm, 66 mm, 67 mm, 68 mm, 69 mm, 70 mm, 71 mm, 72 mm, 73 mm, 74 mm, or 75 mm. Other dimensions are also possible. As depicted in FIG. 1, the lengths of the body portion 138 and the protruding portion 140 may differ. For example, the body portion 138 may account for at least 40%, at least 50%, at least 60%, at least 70%, at least 80%, or at least 90% of the total length of the conductive rod 136, with the protruding portion 140 accounting for the remainder of the length of the conductive rod 136.

The protruding portion 140 of the conductive rod 136 can include an engagement pattern 605. The engagement pattern 605 can facilitate engagement of the conductive rod 136 with the interface portion 134 of the receptacle 130. The engagement pattern 605 can be or can include any topological feature to exert a force on or otherwise mechanically engage with the interface portion 134 of the receptacle 130. For example, the engagement pattern 605 can include variations in the diameter of the protruding portion 140 of the conductive rod 136. Such variations can be formed by features such as grooves, projections, cutouts, or other textured features. These features can be formed, for example, using additive manufacturing techniques that add additional material to selected portions of the conductive rod 136 to cause variations in its diameter. These features can also be formed by etching, grinding, or removing a portion of the material from the conductive rod 136.

The engagement pattern 605 of the conductive rod 136 can be complementary to the engagement pattern 425 of the interface portion 134 of the receptacle 130. For example, complementary engagement patterns may include any set of engagement patterns selected for their mutual ability to mechanically engage with one another. Thus, complementary engagement patterns may include engagement patterns that include features that interlock with one another. For example, the engagement pattern 605 of the conductive rod 136 may include teeth to interlock with grooves included in the engagement pattern 425 of the interface portion 134 of the receptacle 130. In another example, the engagement pattern 425 of the interface portion 134 of the receptacle 130 may include threads and the engagement pattern 605 of the conductive rod 136 may include a screw-shaped feature to screw into the threads of the engagement pattern 425 of the interface portion 134 of the receptacle 130.

The engagement pattern 605 may occupy only a portion of the protruding portion 140 of the conductive rod 136. For example, the engagement pattern 605 may be formed in only 5%, 10%, 15%, 20%, 25%, 30%, 35%, or 40% of the length of the protruding portion 140 of the conductive rod 136. In some examples, the engagement pattern 605 may have a length equal to the length 415 of the interface portion 134 of the receptacle 130. For example, the engagement pattern 605 may have a length between 0.5 mm and 1.5 mm. For example, the engagement pattern 605 can have a length 415 of 0.5 mm, 0.8 mm, 1.0 mm, 1.2 mm, or 1.5 mm. In some implementations, the protruding portion 140 of the conductive rod 136 can also include a tapered tip 610 at the end of the conductive rod 136. For example, the tapered tip 610 can include a portion of the conductive rod 136 where the diameter or width of the conductive rod 136 gradually decreases such that the end of the conductive rod 136 includes a sharp point. The shape of the tapered tip 610 can help an operator to guide the conductive rod 136 into the interface portion 134 of the receptacle 130 during assembly of the battery cell 100.

Figure 7:
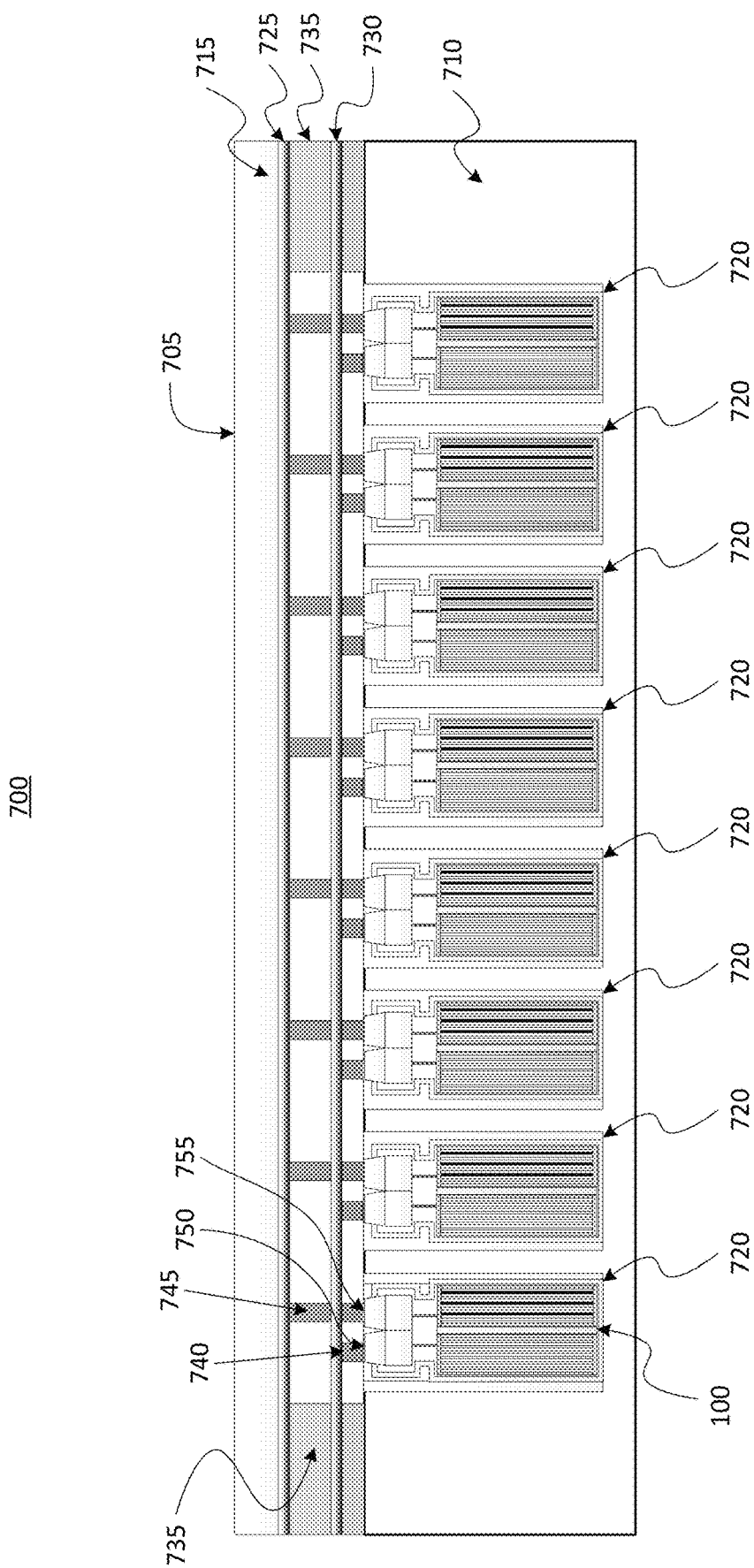
FIG. 7 depicts a cross-sectional view of an example battery pack for holding battery cells in an electric vehicle, according to an illustrative implementation.

FIG. 7 depicts is a cross-sectional view 700 of an example battery pack 705 to hold a plurality of battery cells 100 in an electric vehicle, according to an illustrative implementation. The battery pack 705 can include a battery module case 710 and a capping element 715. The battery module case 710 can be separated from the capping element 715. The battery module case 710 can include or define a plurality of holders 720. Each holder 720 can include a hollowing or a hollow portion defined by the battery module case 710. Each holder 720 can house, contain, store, or hold a battery cell 100. The battery module case 710 can include at least one electrically or thermally conductive material, or combinations thereof. The battery module case 710 can include one or more thermoelectric heat pumps. Each thermoelectric heat pump can be thermally coupled directly or indirectly to a battery cell 100 housed in the holder 720. Each thermoelectric heat pump can regulate temperature or heat radiating from the battery cell 100 housed in the holder 720. Bonding elements 750 and 755, which can each be electrically coupled with a respective terminal (e.g., the first polarity terminal 124 or the second polarity terminal 126) of the battery cell 100, can extend from the battery cell 100 through the respective holder 720 of the battery module case 710.

Between the battery module case 710 and the capping element 715, the battery pack 705 can include a first busbar 725, a second busbar 730, and an electrically insulating layer 735. The first busbar 725 and the second busbar 730 can each include an electrically conductive material to provide electrical power to other electrical components in the electric vehicle. The first busbar 725 (e.g., a first current collector) can be connected or otherwise electrically coupled with the first bonding element 750 extending from each battery cell 100 housed in the plurality of holders 720 via a bonding element 745. The bonding element 745 can be bonded, welded, connected, attached, or otherwise electrically coupled with the bonding element 750. For example, the bonding element 745 can be welded onto a top surface of the bonding element 750. The second busbar 730 (e.g., a second current collector) can be connected or otherwise electrically coupled with the second bonding element 755 extending from each battery cell 100 housed in the plurality of holders 720 via a bonding element 740. The bonding element 740 can be bonded, welded, connected, attached, or otherwise electrically coupled with the second bonding element 755. For example, the bonding element 740 can be welded onto a top surface of the second bonding element 755. The second busbar 730 can define the second polarity terminal for the battery pack 705.

The first busbar 725 and the second busbar 730 can be separated from each other by the electrically insulating layer 735. The electrically insulating layer 735 can include spacing to pass or fit the first bonding element 750 connected to the first busbar 725 and the second bonding element 755 connected to the second busbar 730. The electrically insulating layer 735 can partially or fully span the volume defined by the battery module case 710 and the capping element 715. A top plane of the electrically insulating layer 735 can be in contact or be flush with a bottom plane of the capping element 715. A bottom plane of the electrically insulating layer 735 can be in contact or be flush with a top plane of the battery module case 710. The electrically insulating layer 735 can include any electrically insulating material or dielectric material, such as air, nitrogen, sulfur hexafluoride ($SF_6$), porcelain, glass, and plastic (e.g., polysiloxane), among others to separate the first busbar 725 from the second busbar 730.

Figure 8:
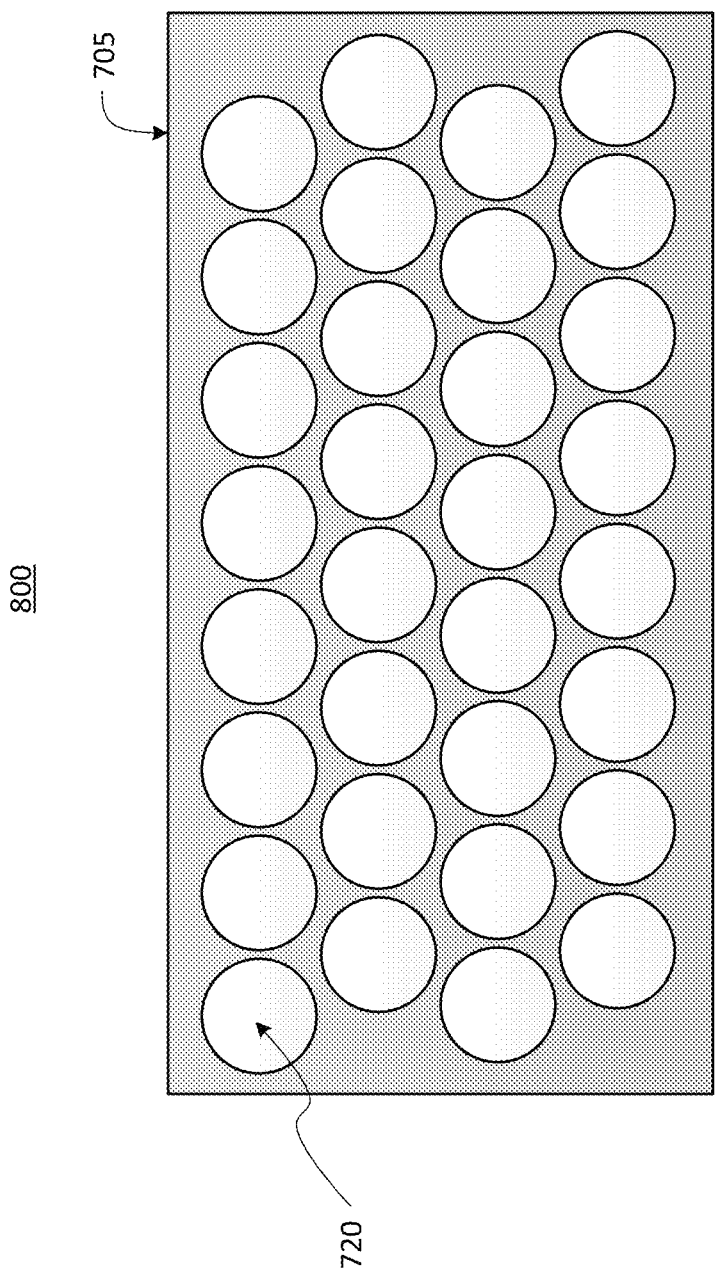
FIG. 8 depicts a top-down view of an example battery pack for holding for battery cells in an electric vehicle, according to an illustrative implementation.

FIG. 8 depicts a top-down view 800 of an example battery pack 705 to hold a plurality of battery cells 100 in an electric vehicle, according to an illustrative implementation. The battery pack 705 can define or include a plurality of holders 720. The shape of each holder 720 can be triangular, rectangular, pentagonal, elliptical, and circular, among others. The shapes of each holder 720 can vary or can be uniform throughout the battery pack 705. For example, some holders 720 can be hexagonal in shape, whereas other holders can be circular in shape. The shape of the holder 720 can match the shape of a housing of each battery cell 100 contained therein. The dimensions of each holder 720 can be larger than the dimensions of the battery cell 100 housed therein.

Figure 9:
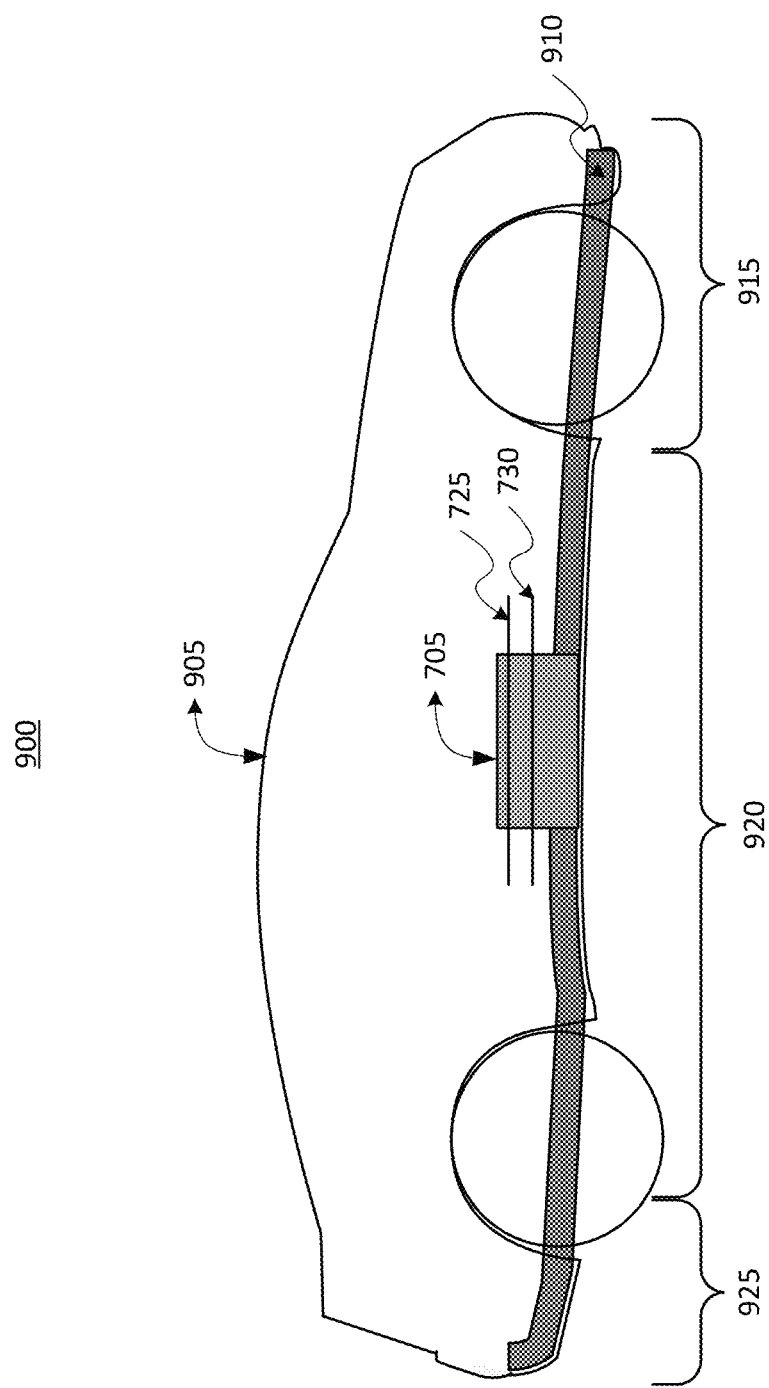
FIG. 9 depicts a cross-sectional view of an example electric vehicle installed with a battery pack, according to an illustrative implementation.

Referring to FIG. 9, depicted is a cross-sectional view 900 of an electric vehicle 905 installed with a battery pack 705, according to an illustrative implementation. The electric vehicle 905 can include a chassis 910 (e.g., a frame, internal frame, or support structure). The chassis 910 can support various components of the electric vehicle 905. The chassis 910 can span a front portion 915 (e.g., a hood or bonnet portion), a body portion 920, and a rear portion 925 (e.g., a trunk portion) of the electric vehicle 905. The battery pack 705 can be installed or placed within the electric vehicle 905. The battery pack 705 can be installed on the chassis 910 of the electric vehicle 905 within the front portion 915, the body portion 920 (as depicted in FIG. 9), or the rear portion 925. The first busbar 725 and the second busbar 730 can be connected or otherwise be electrically coupled with other electrical components of the electric vehicle 905 to provide electrical power.

Figure 10:
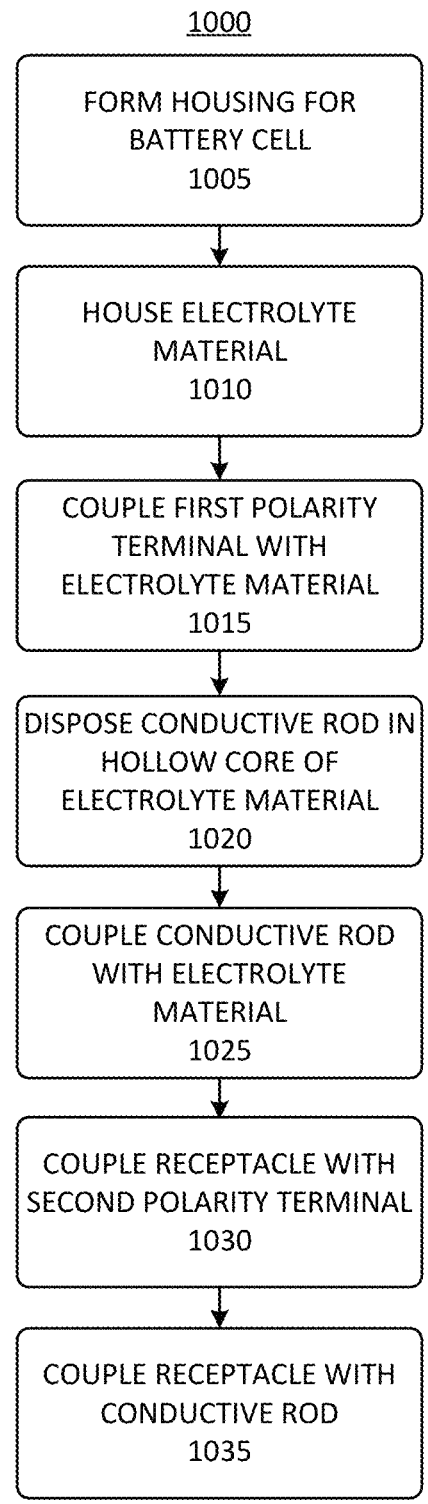
FIG. 10 depicts a flow chart of an example process for manufacturing a battery cell for a battery pack of an electric vehicle, according to an illustrative implementation.

FIG. 10 depicts a flow chart of an example process 1000 of manufacturing a battery cell 100, according to an illustrative implementation. The method 1000 can include forming a housing 102 for the battery cell 100 (ACT 1005). The housing 102 can define a sidewall or side surface of the battery cell 100, and can extend between an open end 104 and a closed end 106 of the housing 102. In some examples, the housing 102 can be cylindrical in shape. The method 1000 can also include providing an electrolyte material 112 within the housing 105 (ACT 1010). The electrolyte material 112 can include any electrically active material capable of supplying electric power for the battery cell 100. For example, the electrolyte material 112 can be or can include a winded electrode that defines a hollow core along its central axis. The electrolyte material 112 can include portions having opposite electrical polarities, such as positive and negative polarities. For example, the electrolyte material 112 can include the first polarity portion 114 and the second polarity portion 116, which may be electrically insulated from one another.

The method 1000 can include electrically coupling the first polarity terminal 124 of the battery cell 100 with the electrolyte material 112 (ACT 1015). The first polarity terminal 124 can be coupled with the first polarity portion 114 of the electrolyte material 112. For example, the first tab 120 can facilitate the electrical connection between the first polarity portion 114 of the electrolyte material 112 and the first polarity terminal 124. The first tab 120 can be welded (e.g., spot welded, ultrasonic welded, or laser welded) with either or both of the first polarity terminal 124 and the first polarity portion 114 of the electrolyte material 112. The first tab 120 may also be electrically coupled with either or both of the first polarity terminal 124 and the first polarity portion 114 of the electrolyte material 112 using other means, such as a mechanical fastener or an electrically conductive adhesive.

The method 1000 can include disposing the conductive rod 136 in the hollow core 118 of the electrolyte material 112 (ACT 1020). The conductive rod 136 can be an elongated electrically conductive component having a body portion 138 and a protruding portion 140. For example, the conductive rod 136 can be a narrow cylinder or pin that can be inserted into the hollow core 118 of the electrolyte material 112. The conductive rod 136 can be disposed such that the body portion 138 is positioned within the hollow core 118 of the electrolyte material 112, while the protruding portion 140 extends outwards from an edge of the electrolyte material 112 toward the open end 104 of the housing 102. The method 1000 can also include disposing an insulating layer between the electrolyte material 112 and the conductive rod 136 to electrically insulate the conductive rod 136 from the electrolyte material 112 within the hollow core 118.

The method 1000 can include electrically coupling the conductive rod 136 with the electrolyte material 112 (ACT 1025). The conductive rod 136 can be coupled with the second polarity portion 116 of the electrolyte material 112. For example, the second tab 122 can facilitate the electrical connection between the second polarity portion 116 of the electrolyte material 112 and the conductive rod 136. The second tab 122 can be welded (e.g., spot welded, ultrasonic welded, or laser welded) with either or both of the conductive rod 136 and the second polarity portion 116 f the electrolyte material 112. The second tab 122 may also be electrically coupled with either or both of the conductive rod 136 and the second polarity portion 116 of the electrolyte material 112 using other means, such as a mechanical fastener or an electrically conductive adhesive.

The method 1000 can include electrically coupling the receptacle 130 with the second polarity terminal 126 of the battery cell 100 (ACT 1030). The receptacle 130 can include the support portion 132 and the interface portion 134. The support portion 132 of the receptacle 130 can secure the receptacle 130 to the second polarity terminal 126. For example, the support portion 132 can include a planar surface disposed adjacent to a surface of the second polarity terminal 126 and secured to the second polarity terminal 126 via one or more spot welds. The receptacle 130 can be secured to a surface of the second polarity terminal 126 that faces an interior of the battery cell 100 after the battery cell 100 has been assembled. The second polarity terminal 126 can be disposed at the open end 104 of the housing 102 when the battery cell 100 is assembled.

The method 1000 can include electrically coupling the receptacle 130 with the conductive rod 136 (ACT 1035). The electrical connection can be formed between the interface portion 134 of the receptacle 130 and the protruding portion 140 of the conductive rod 136. For example, the interface portion 134 of the receptacle 130 can receive the protruding portion 140 of the conductive rod 136 for purposes of making the electrical connection. The protruding portion 140 of the conductive rod 136 can be secured within the interface portion 134 of the receptacle 130 via an interference fit. To facilitate the interference fit, either or both of the interface portion 134 of the receptacle 130 and the protruding portion 140 can include a respective engagement pattern. For example, the interface portion 134 of the receptacle 130 can include an engagement pattern 425 having grooves, projections, cutouts, teeth, or any other features that change the geometry of an inner side surface of the interface portion 134 of the receptacle 130. The protruding portion 140 of the conductive rod 136 may include an engagement pattern 605 having similar features, which may be complementary to the features of the engagement pattern 425 of the receptacle 130. The receptacle 130 and the conductive rod 136 may therefore be pressed together to make the electrical connection between them.

Electrical current can therefore be carried from the second polarity portion 116 of the electrolyte material 112, through the second tab 122 to the conductive rod 136. The conductive rod 136 carries the electrical current to the receptacle 130, which in turn carries the electrical current to the second polarity terminal 126. Thus, the techniques described in this disclosure can establish both positive and negative connections at or near the same end of the battery cell (e.g., the open end 104 of the housing 102) in a manner that does not require any change to the design of the winded electrode or the process for manufacturing the winded electrode.

Figure 11:
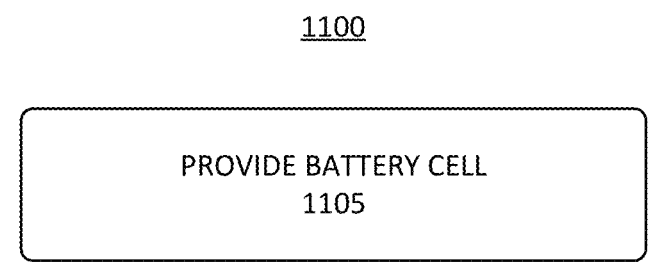

FIG. 11 depicts a flow chart of an example process 1100, according to an illustrative implementation. The process 1100 can include providing a battery cell 100 (ACT 1105). For example, the battery cell 100 can be a battery cell of a battery pack 705 to power an electric vehicle 905. The battery cell 100 can include a housing 102 that defines a cavity that extends between an open end 104 of the housing 102 and a closed end 106 of the housing 102. The battery cell 100 can include an electrolyte material 112 housed within the cavity.

The electrolyte material 112 can have a first polarity portion 114 and a second polarity portion 116. The electrolyte material 112 can define a hollow core 118 along a central axis of the electrolyte material 112. The battery cell 100 can include a first polarity terminal 124 disposed at the open end 104 of the housing 102. The battery cell 100 can include a first conductive tab 120 disposed at the open end of the housing 104. The first conductive tab 120 can be electrically coupled with the first polarity portion 114 of the electrolyte material 112. The battery cell 100 can include a second polarity terminal 126 disposed at the open end 106 of the housing 102.

The battery cell 100 can include a gasket 144 disposed between the first polarity terminal 124 and the second polarity terminal 126. The gasket 144 can electrically insulate the first polarity terminal 124 from the second polarity terminal 126. The battery cell 100 can include a second conductive tab 122 disposed at the closed end 106 of the housing 102. The second conductive tab 122 can be electrically coupled with the second polarity portion 116 of the electrolyte material 112. The battery cell 100 can include a conductive rod 136 having a body portion 138 disposed inside the hollow core 118 of the electrolyte material 112.

The conductive rod 136 can have a protruding portion 140 coupled with the body portion 138. The protruding portion 140 of the conductive rod 136 can extend away from the electrolyte material 112 material toward the open end 104 of the housing 102. The body portion 138 of the conductive rod 136 can be electrically coupled with the second conductive tab 122 at the closed end 104 of the housing 102. The battery cell 100 can include an insulating layer 142 to electrically insulate the conductive rod 136 from the electrolyte material 112 within the hollow core 118 of the electrolyte material 112.

The battery cell 100 can include a receptacle 130 having a support portion 132 electrically coupled with the second polarity terminal 126. The receptacle 130 can have an interface portion 134 coupled with the support portion 132. The interface portion 134 of the receptacle 130 can extend toward the electrolyte material 112. The interface portion 134 of the receptacle 130 can engage with the protruding portion 140 of the conductive rod 136 at the open end 104 of the housing 102 to form an electrical connection that electrically couples the second polarity portion 116 of the electrolyte material 112, the second conductive tab 122, the conductive rod 136, the receptacle 130, and the second polarity terminal 126.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack for an electric vehicle, comprising:
    a housing that defines a cavity that extends between an open end of the housing and a closed end of the housing;
    an electrolyte material housed within the cavity, the electrolyte material having a first polarity portion and a second polarity portion, the electrolyte material defining a hollow core along a central axis of the electrolyte material;
    a first polarity terminal disposed at the open end of the housing, the first polarity terminal comprising a vent plate, the vent plate having a scoring mark to tear in response to a threshold pressure within the housing of the battery cell;
    a first conductive tab disposed at the open end of the housing, the first conductive tab electrically coupled with the first polarity portion of the electrolyte material;
    a second polarity terminal disposed at the open end of the housing;
    a gasket disposed between the first polarity terminal and the second polarity terminal, the gasket to electrically insulate the first polarity terminal from the second polarity terminal;
    a second conductive tab disposed at the closed end of the housing, the second conductive tab electrically coupled with the second polarity portion of the electrolyte material;
    a conductive rod having a body portion disposed inside the hollow core of the electrolyte material, the conductive rod having a protruding portion coupled with the body portion, the protruding portion of the conductive rod extending away from the electrolyte material toward the open end of the housing, the body portion of the conductive rod electrically coupled with the second conductive tab at the closed end of the housing;
    an insulating layer to electrically insulate the conductive rod from the electrolyte material within the hollow core of the electrolyte material; and
    a receptacle having a support portion electrically coupled with the second polarity terminal, the receptacle having an interface portion coupled with the support portion, the interface portion extending toward the electrolyte material, the interface portion of the receptacle to engage with the protruding portion of the conductive rod at the open end of the housing to form an electrical connection that electrically couples the second polarity portion of the electrolyte material, the second conductive tab, the conductive rod, the receptacle, and the second polarity terminal, the support portion comprising cutouts to allow gas to pass through the support portion.

2. The battery cell of claim 1, wherein:
the vent plate has a scoring pattern that defines a scored region of the vent plate; and
the support portion of the receptacle is coupled with the vent plate at an area within the scored region of the vent plate.

3. The battery cell of claim 1, wherein:
the protruding portion of the conductive rod comprises a tapered tip portion.

4. The battery cell of claim 1, wherein:
the receptacle comprises a first engagement pattern; and
the protruding portion of the conductive rod comprises a second engagement pattern complementary to the first engagement pattern.

5. The battery cell of claim 1, wherein:
the interface portion of the receptacle is configured to receive the protruding portion of the conductive rod to secure the protruding portion of the conductive rod in place via an interference fit between the interface portion of the receptacle and the protruding portion of the conductive rod.

6. The battery cell of claim 1, wherein:
the body portion of the conductive rod has a cylindrical shape.

7. The battery cell of claim 1, wherein:
the support portion of the receptacle is in contact with an end of the protruding portion of the conductive rod to exert a compressive force on the conductive rod.

8. The battery cell of claim 1, wherein:
the conductive rod comprises copper; and
the receptacle comprises aluminum.

9. The battery cell of claim 1, wherein:
the housing has a crimped portion to secure the gasket, the first polarity terminal, and the second polarity terminal in place at the open end of the housing.

10. The battery cell of claim 1, wherein:
the support portion of the receptacle has a diameter between 8 mm and 14 mm and a thickness between 0.2 mm and 0.6 mm.

11. The battery cell of claim 1, wherein:
the interface portion of the receptacle has a length between 0.5 mm and 1.5 mm.

12. The battery cell of claim 1, wherein:
the conductive rod has a diameter between 1 mm and 4 mm and a length between 65 mm and 75 mm.

13. The battery cell of claim 1, wherein:
the battery pack includes a plurality of additional battery cells.

14. The battery cell of claim 1, wherein:
the battery cell is disposed in the electric vehicle within the battery pack to provide electrical power to the electric vehicle.

15. An electric vehicle, comprising:
a battery pack installed in the electric vehicle to power the electric vehicle, the battery pack comprising:
  a battery cell comprising:
    a housing that defines a cavity that extends between an open end of the housing and a closed end of the housing;
    an electrolyte material housed within the cavity, the electrolyte material having a first polarity portion and a second polarity portion, the electrolyte material defining a hollow core along a central axis of the electrolyte material;
    a first polarity terminal disposed at the open end of the housing, the first polarity terminal comprising a vent plate, the vent plate having a scoring mark to tear in response to a threshold pressure within the housing of the battery cell;
    a first conductive tab disposed at the open end of the housing, the first conductive tab electrically coupled with the first polarity portion of the electrolyte material;
    a second polarity terminal disposed at the open end of the housing;
    a gasket disposed between the first polarity terminal and the second polarity terminal, the gasket to electrically insulate the first polarity terminal from the second polarity terminal;
    a second conductive tab disposed at the closed end of the housing, the second conductive tab electrically coupled with the second polarity portion of the electrolyte material;
    a conductive rod having a body portion disposed inside the hollow core of the electrolyte material, the conductive rod having a protruding portion coupled with the body portion, the protruding portion of the conductive rod extending away from the electrolyte material toward the open end of the housing, the body portion of the conductive rod electrically coupled with the second conductive tab at the closed end of the housing;
    an insulating layer to electrically insulate the conductive rod from the electrolyte material within the hollow core of the electrolyte material; and
    a receptacle having a support portion electrically coupled with the second polarity terminal, the receptacle having an interface portion coupled with the support portion, the interface portion extending toward the electrolyte material, the interface portion of the receptacle to engage with the protruding portion of the conductive rod at the open end of the housing to form an electrical connection that electrically couples the second polarity portion of the electrolyte material, the second conductive tab, the conductive rod, the receptacle, and the second polarity terminal, the support portion comprising cutouts to allow gas to pass through the support portion.

16. A method of providing battery packs having the battery cell according to claim 1, comprising:
forming the housing for the battery cell of the battery pack to power the electric vehicle;
housing, within the cavity, the electrolyte material;
electrically coupling the first polarity terminal of the battery cell with the first polarity portion of the electrolyte material via the first conductive tab;
disposing the body portion of the conductive rod inside the hollow core of the electrolyte material;
electrically coupling the body portion of the conductive rod with the second polarity portion of the electrolyte material via the second conductive tab;
coupling the support portion of the receptacle with the second polarity terminal of the battery cell; and
electrically coupling the interface portion of the receptacle with the protruding portion of the conductive rod at the open end of the housing to form the electrical connection that electrically couples the second polarity portion of the electrolyte material, the second conductive tab, the conductive rod, the receptacle, and the second polarity terminal.

17. The method of claim 16, comprising:
defining a scoring pattern on a surface of the vent plate that forms at least a portion of the first polarity terminal.

18. The method of claim 16, comprising:
electrically insulating the first polarity terminal from the second polarity terminal via the gasket.

19. The method of claim 16, comprising:
crimping a portion of the housing around the first polarity terminal and the second polarity terminal to secure the first polarity terminal and the second polarity terminal in place at the open end of the housing.

* * * * *